(12) United States Patent
Chevalier

(10) Patent No.: US 7,004,484 B1
(45) Date of Patent: Feb. 28, 2006

(54) PROVIDING AN ENHANCED ATV RIDING EXPERIENCE

(75) Inventor: Mark Chevalier, Forest Lake, MN (US)

(73) Assignee: Polaris Industries Inc., Medina, MN (US)

( * ) Notice: Subject to any disclaimer, the term of this patent is extended or adjusted under 35 U.S.C. 154(b) by 70 days.

(21) Appl. No.: 10/188,235

(22) Filed: Jul. 2, 2002

Related U.S. Application Data

(60) Provisional application No. 60/313,599, filed on Aug. 20, 2001, provisional application No. 60/313,417, filed on Aug. 17, 2001.

(51) Int. Cl.
*B60G 7/02* (2006.01)

(52) U.S. Cl. .................. 280/86.751; 280/124.134; 280/124.136

(58) Field of Classification Search .......... 280/86.751, 280/124.134, 124.135, 124.136, 86.75
See application file for complete search history.

(56) References Cited

U.S. PATENT DOCUMENTS

| | | |
|---|---|---|
| 2,245,809 A | 6/1941 | Olley |
| 3,147,990 A | 9/1964 | Wettstein |
| 3,161,419 A | 12/1964 | Schaaf |
| 3,189,118 A | 6/1965 | Aming |
| 3,827,516 A | 8/1974 | Lucia |
| 3,858,901 A | 1/1975 | Johnson |
| 3,881,741 A | 5/1975 | Müller |
| 3,883,152 A | 5/1975 | de Carbon |
| 3,884,314 A | 5/1975 | Callaway |
| 3,912,030 A | 10/1975 | Payne |
| 4,313,619 A | 2/1982 | Hailer |
| 4,457,537 A | 7/1984 | von der Ohe et al. |
| 4,462,609 A * | 7/1984 | von der Ohe ......... 280/124.143 |
| 4,610,461 A | 9/1986 | Guzzetta |
| 4,620,715 A | 11/1986 | Takahashi |
| 4,625,982 A | 12/1986 | Matsuo |
| 4,650,029 A | 3/1987 | Foote et al. |
| 4,657,271 A | 4/1987 | Salmon |
| 4,671,521 A | 6/1987 | Talbot et al. |
| 4,699,234 A | 10/1987 | Shinozaki et al. |
| 4,749,205 A | 6/1988 | Takahashi et al. |
| 4,925,207 A | 5/1990 | Haraguchi |
| 4,968,056 A | 11/1990 | Haraguchi |
| 5,000,476 A | 3/1991 | Lindorfer et al. |
| 5,029,664 A | 7/1991 | Zulawski |
| 5,074,582 A | 12/1991 | Parsons |
| 5,193,330 A | 3/1993 | Nusser |
| 5,197,755 A | 3/1993 | Quick |
| 5,513,874 A * | 5/1996 | Mori ....................... 280/93.51 |
| 5,558,360 A | 9/1996 | Lee |
| 5,628,169 A | 5/1997 | Stiller et al. |
| 5,938,219 A * | 8/1999 | Hayami et al. ....... 280/124.135 |
| 5,992,868 A * | 11/1999 | Orimoto .............. 280/124.138 |
| 6,009,966 A | 1/2000 | Olson et al. |
| 6,022,034 A | 2/2000 | Santo et al. |
| 6,125,958 A | 10/2000 | Olson et al. |
| 6,173,978 B1 | 1/2001 | Wagner |

(Continued)

*Primary Examiner*—Paul N. Dickson
*Assistant Examiner*—Toan To
(74) *Attorney, Agent, or Firm*—Fredrikson & Byron, P.A.

(57) ABSTRACT

Methods and apparatus related to the suspension and braking of all terrain vehicles (ATVs) are disclosed. An ATV having a frame and a wheel carrier coupled to the frame by a suspension is provided. A suspension in accordance with the present invention preferably has a side view instant center axis which intersects a strategic region. Methods in accordance with the present invention may be used to define the boundaries of the strategic region.

44 Claims, 19 Drawing Sheets

U.S. PATENT DOCUMENTS

| | | |
|---|---|---|
| 6,176,414 B1 | 1/2001 | Sadler |
| 6,179,314 B1 * | 1/2001 | Jones ......................... 280/282 |
| 6,311,798 B1 | 11/2001 | Anderson |
| 6,343,666 B1 | 2/2002 | Olson et al. |
| 6,357,543 B1 | 3/2002 | Karpik |
| 6,431,569 B1 * | 8/2002 | Handa ................. 280/124.138 |
| 6,692,366 B1 * | 2/2004 | Savant ....................... 464/170 |
| 6,752,409 B1 * | 6/2004 | Kunert ................ 280/124.138 |
| 6,827,361 B1 | 12/2004 | Seki |
| 2002/0017765 A1 | 2/2002 | Mallett et al. |

* cited by examiner

PROVIDING AN ENHANCED ATV RIDING EXPERIENCE

RELATED APPLICATIONS

This application is related to and claims priority to U.S. Provisional Application No. 60/313,599 by Chevalier filed Aug. 20, 2001, and entitled Suspension System for an ATV.

This application is also related to and claims priority to U.S. Provisional Application No. 60/313,417 by Chevalier filed Aug. 17, 2001, and entitled Steering System for an ATV.

The disclosures of the above mentioned applications are hereby incorporated by reference in their entirety.

FIELD OF THE INVENTION

The present invention relates generally to all terrain vehicles having a straddle-seat for accommodating a rider and a set of handle bars for receiving the hands of the rider. More particularly, the present invention relates to suspension and braking systems for all terrain vehicles.

BACKGROUND OF THE INVENTION

In recent years, all terrain vehicles (ATVs) have gained widespread popularity. ATVs are commonly used in hunting, trail riding and utility applications such as the wide variety of maintenance activities which take place on a farm. Attachments are available for ATVs for use in utility applications such as plowing snow, mowing grass and hauling materials.

Perhaps the most common ATV application is trail riding. Trail riding on an ATV allows an ATV enthusiast to travel through areas which are not accessible by ordinary automobiles. Modern ATVs, can cover ground very rapidly and can cover great distances. Frequently, ATV enthusiasts ride their ATV for many hours straight and cover many miles. If the rider is subjected to excessive jarring while traveling over rough terrain, operator fatigue may result particularly during a long ride. During such long rides, an ATV may be used to carry a rider through a wide variety of terrain. Terrain which may be encountered includes forests, swamps, and deserts. Frequently ATVs are called upon to travel across rugged terrain at relatively high speeds.

Part of the thrill of riding an ATV is encountering challenging terrain, and through the performance of the ATV and the skill of the rider passing through the terrain. The ability to tackle challenging terrain may depend on the performance of the steering systems, suspension, and the interface between the rider and the ATV. These elements each effect the riding experience enjoyed by the ATV enthusiast.

SUMMARY OF THE INVENTION

The present invention relates generally to all terrain vehicles having a straddle-seat for accommodating a rider and a set of handle bars for receiving the hands of the rider. More particularly, the present invention relates to suspension and braking systems for all terrain vehicles. An ATV in accordance with the present invention may have a frame and a wheel carrier coupled to the frame by a suspension. A suspension in accordance with the present invention preferably has a side view instant center axis which intersects a strategic region. Methods in accordance with the present invention may be used to define the boundaries of the strategic region.

In certain advantageous implementations of the present invention, the strategic region has a generally rectangular cross section including four sides. In these implementations, the first side of the strategic region may overlap a wheel contact plane of the ATV and the second side of the strategic region may be generally parallel to the wheel contact plane. The second side of the strategic region may also intersect a pivoting axis of the wheel of the ATV. Also in these implementations, the third side of the strategic region may extend between the pivoting axis of the at least one front wheel, and a momentary contact point of the at least one front wheel. The fourth side of the strategic region may be generally parallel to the third side of the strategic region, and be located a predetermined distance behind the third side of the strategic region.

Methods in accordance with the present invention may be used to define the boundaries of an advantageous strategic region. A method in accordance with the present invention may includes the steps of 1) identifying a bottom side of a strategic region, 2) identifying a top side of the strategic region, 3) identifying a front side of the strategic region, and 4) identifying a rear side of the strategic region.

In some methods in accordance with the present invention the step of identifying the bottom side of the strategic region may include the steps of identifying a wheel contact plane defined by the momentary contact points of the wheels of the ATV, and identifying a bottom side which overlays the wheel contact plane.

In some methods in accordance with the present invention the step of identifying the top side of the strategic region may include the steps of identifying a wheel axis plane which intersects a pivot axis of a wheel of the ATV, and identifying a side of the strategic region which overlays the wheel axis plane.

In some methods in accordance with the present invention the step of identifying the front side of the strategic region may include the steps of selecting a maximum caster change angle, and selecting a location for the front side of the strategic region which provides a caster change angle that is less than the selected maximum caster change angle.

In some methods in accordance with the present invention the step of identifying the rear side of the strategic region may include the steps of selecting a minimum retracting wheel motion angle, and selecting a location for the rear side of the strategic region which provides a retracting wheel motion angle that is greater than the selected minimum retracting wheel motion angle.

A suspension in accordance with the certain exemplary embodiments comprises a first arm rotatably coupled to the frame such that the first arm rotates about a first rotational axis and a second arm rotatably coupled to the frame such that the second arm rotates about a second rotational axis. The first axis may advantageously intersect the ground contact plane at a first angle, and the second axis intersects the ground contact plane at a second angle. In certain advantageous implementations, the second angle is different from the first angle. The side view instant center axis of the suspension may be defined by an intersection of the first rotational axis and the second rotational axis.

It is to be appreciated that an ATV in accordance with the present invention may comprise various suspensions without deviating from the spirit and scope of the present invention. Examples of suspensions which may be suitable in some applications include double A-arm suspensions, McPherson strut suspensions, trailing arm suspensions, and multiple link suspensions (e.g., four link suspensions).

DETAILED DESCRIPTION

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

Figure 1:
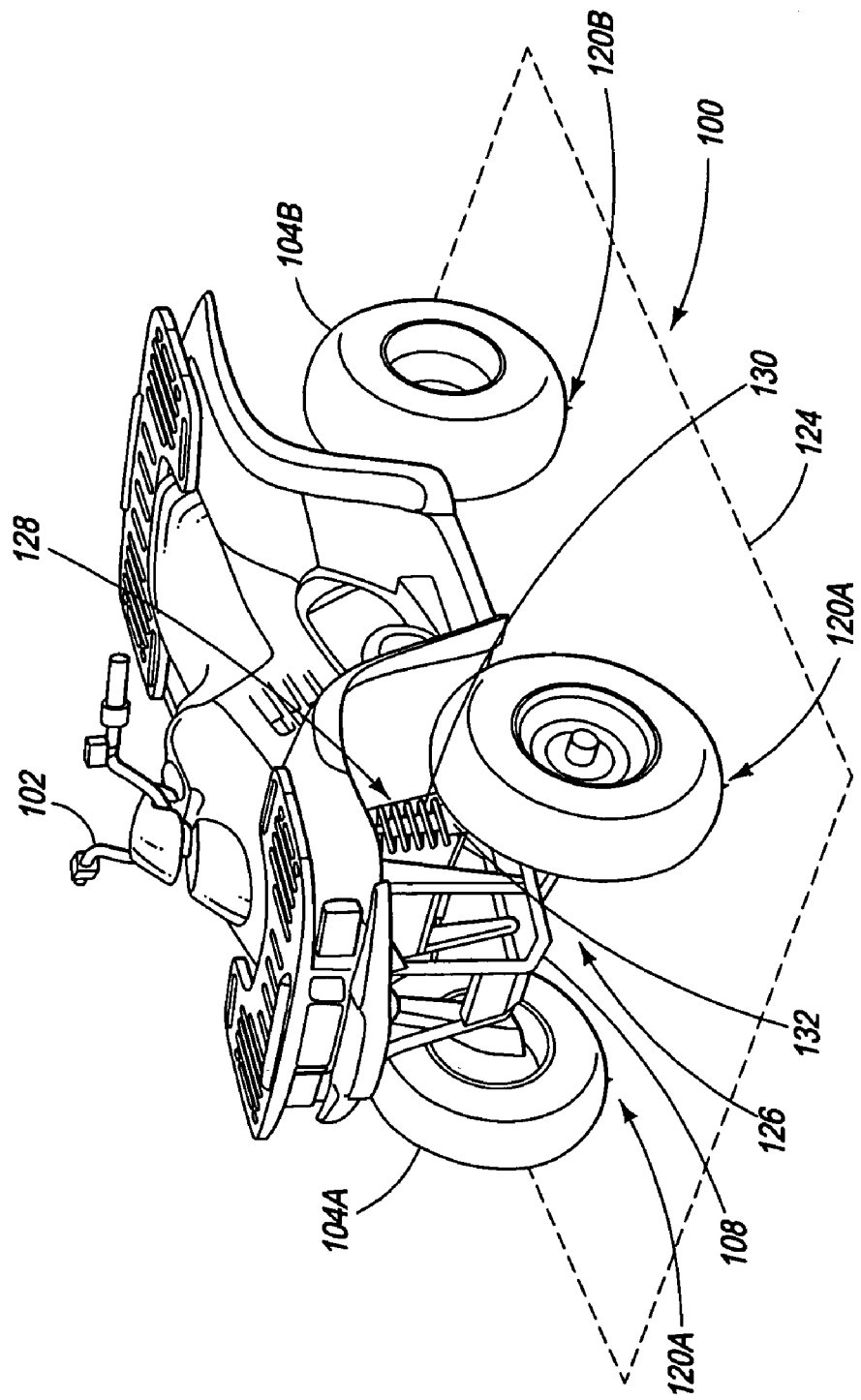
FIG. 1 is a perspective view of an ATV in accordance with an exemplary embodiment of the present invention.

FIG. 1 is a perspective view of an ATV 100 in accordance with an exemplary embodiment of the present invention. ATV 100 preferably includes two front wheels and two rear wheels. A set of handle bars 102 are coupled to front wheels 104A for steering ATV 100. An engine may be used to power each rear wheel 104B, and in some cases also each front wheel 104. ATV 100 also includes a straddle-type seat and foot rests for use by a rider of ATV 100 In the embodiment of FIG. 1, engine and seat are both preferably coupled to a frame 108 of ATV 100.

As shown in FIG. 1, each of front wheel 104A has a momentary contact point 120A. Likewise, each of rear wheel 104B has a momentary contact point 120B. The momentary contact points of the wheels define a wheel contact plane 124. In the embodiment of FIG. 1, each front wheel 104A is coupled to frame 108 by a suspension 126 and each rear wheel 104B is also coupled to frame 108 by a suspension.

In a preferred embodiment, suspension 126 is adapted to deflect so that front wheel 104A can travel between a full compression position and a full extension position. In the embodiment of FIG. 1, front wheel 104A is shown in an intermediate position lying between the full extension position and the full compression position. Various intermediate positions are possible without deviating from the spirit and scope of the present invention. For example, one intermediate position may be found when ATV 100 is at rest and the weight of ATV 100 is supported at least in part by suspension 126 and front wheel 104A. Another example of an intermediate position may be found when ATV 100 is at rest and the weight of both a rider and ATV 100 are supported at least in part by suspension 126 and front wheel 104A.

In the embodiment of FIG. 1, suspension 126 includes a spring assembly 128 including a spring 130 that is disposed about a shock absorber 132. It is to be appreciated that suspension 126 of ATV 100 may comprise various suspensions without deviating from the spirit and scope of the present invention. Examples of suspensions which may be suitable in some applications include double A-arm suspensions, McPherson strut suspensions, trailing arm suspensions, and multiple link suspensions (e.g., four link suspensions).

Figure 2:
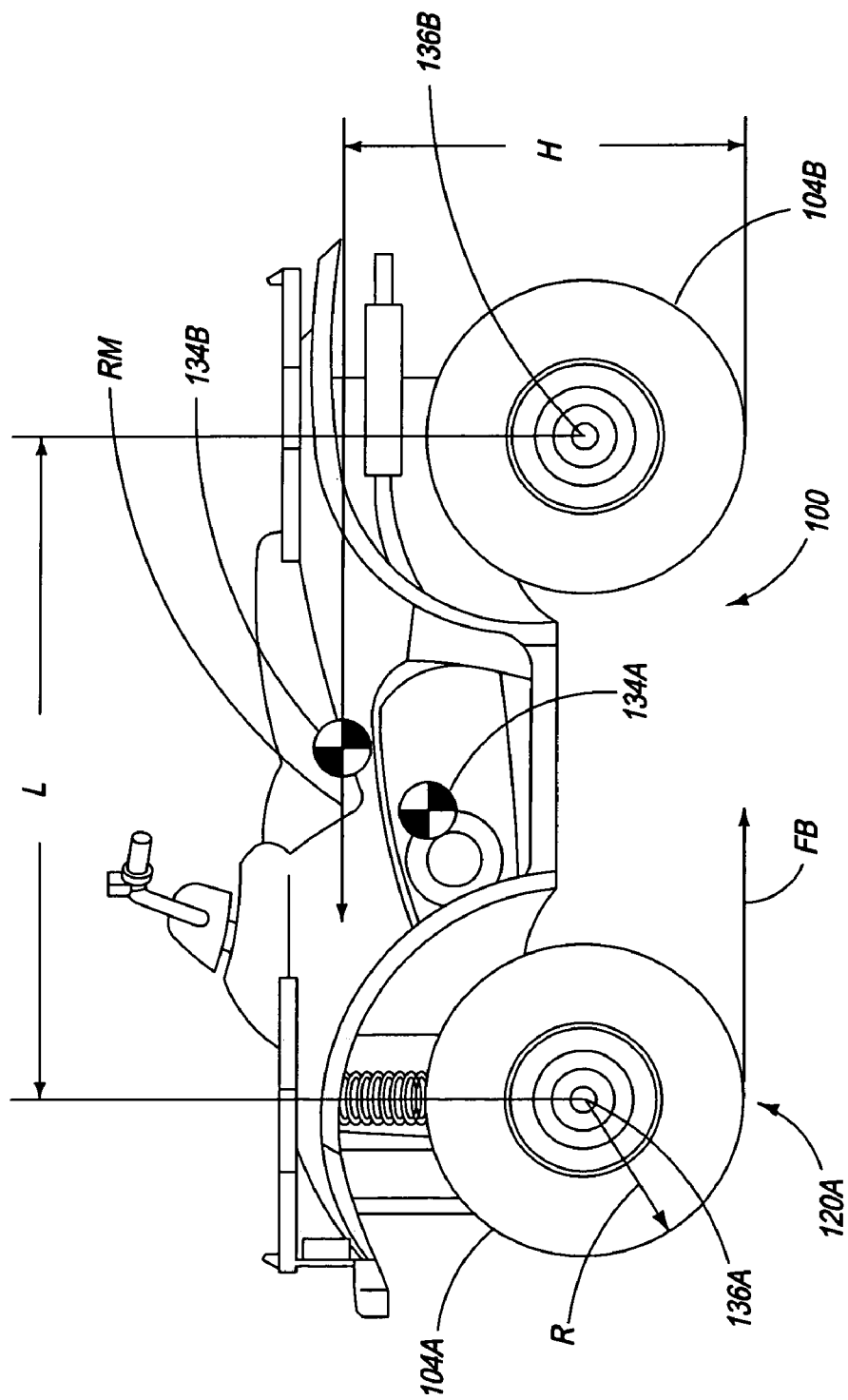
FIG. 2 is a plan view of an ATV.

FIG. 2 is a plan view of an ATV 100. In FIG. 2, a first symbol 134A and a second symbol 134B are shown overlaying ATV 100. First symbol 134A illustrates the approximate location of the center of mass of ATV 100. Second symbol 134B illustrates the approximate location of a center of the combined mass of ATV 100 and an ATV rider.

In FIG. 2 it may be appreciated that the center of the combined mass of ATV 100 and the ATV rider is located a distance H above a momentary contact point 120A of a front wheel 104A of ATV 100. In FIG. 2, it may also be appreciated that the pivot axis 136A of front wheel 104A is separated from the pivot axis 136B of rear wheel 104B by a wheel base distance L.

In the embodiment of FIG. 2, front wheel 104A has a radius R. In some useful embodiments, ATV 100 has an L:R ratio between about 1 and 7. In some advantageous embodiments, ATV 100 has an L:R ratio between about 2 and 6. In some particularly advantageous embodiments, ATV 100 has an L:R ratio between about 3 and about 5.

In FIG. 2, a reference arrow RM is shown extending from second symbol 134B in a forward direction. Reference arrow RM represents the momentum of ATV 100 and an ATV rider while they are traveling in a forward direction. In FIG. 2, a second reference arrow FB is shown extending from front wheel 104A in a generally rearward direction. Reference arrow FB represents the braking force applied to front wheel 104A during braking of ATV 100 while ATV 100 is traveling in a forward direction.

Figure 3:
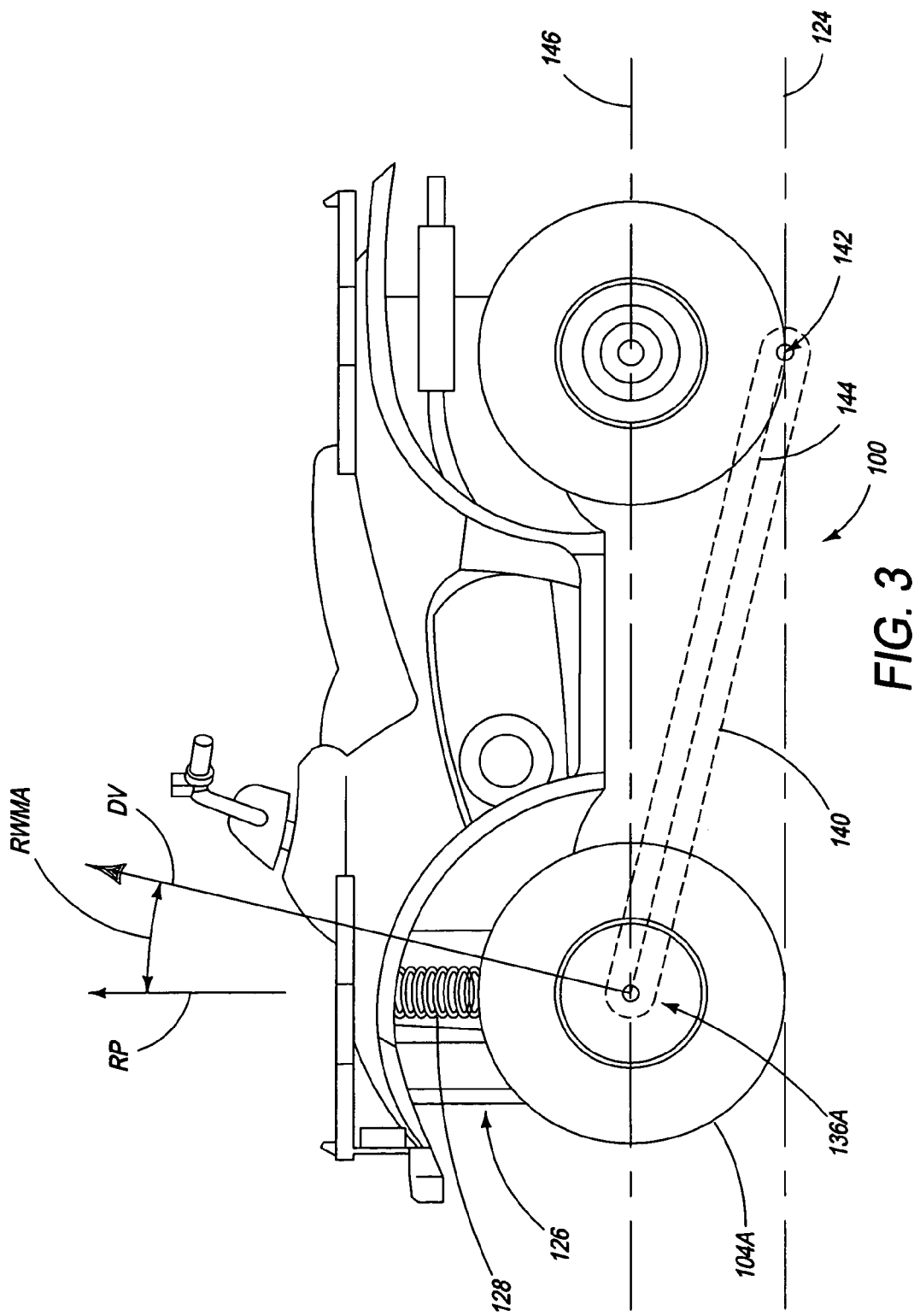
FIG. 3 is an additional plan view of ATV of FIG. 3.

FIG. 3 is an additional plan view of ATV 100 of the previous figure. In the embodiment of FIG. 3, front wheel 104A is supported by a suspension 126 including a spring assembly 128. Suspension 126 is preferably adapted to compress and extend, for example, when ATV 100 encounters rough terrain. The instant motion of a pivot axis 136A of front wheel 104A during extension or compression of suspension 126 is illustrated in FIG. 3 using an imaginary link 140 which pivots about a side view instant center axis 142 of suspension 126. The instant motion of a pivot axis 136A of front wheel 104A during compression of suspension 126 is also illustrated using an instantaneous direction vector DV in FIG. 3. In FIG. 3 it may be appreciated that instantaneous direction vector DV extends generally upwardly and rearwardly. In FIG. 3, it may also be appreciated that instantaneous direction vector DV is generally perpendicular to a longitudinal axis 144 of imaginary link 140.

In FIG. 3 a retracting wheel motion angle of suspension 126 is labeled with the letters RWMA. In the embodiment of FIG. 3, retracting wheel motion angle RWMA is defined by instantaneous direction vector DV and a reference plane RP. In FIG. 3 it may be appreciated that reference plane RP is generally perpendicular to a wheel contact plane 124 defined by the momentary contact points of the wheels of ATV 100.

In FIG. 3, a wheel axis plane 146 is shown extending through pivot axis 136A of front wheel 104A. With continuing reference to FIG. 3 it may be appreciated that instantaneous direction vector DV will be directed somewhat rearwardly when side view instant center axis 142 of suspension 126 is located below wheel axis plane 146. With continuing reference to FIG. 3, it may be appreciated that a suspension having a rearwardly directed instantaneous direction vector DV provides retracting wheel motion. When front wheel 104A of ATV 100 encounters an obstacle such as, for example, a log or a sharp bump, retracting wheel motion may facilitate absorbion of the resulting impact by suspension 126.

Figure 4:
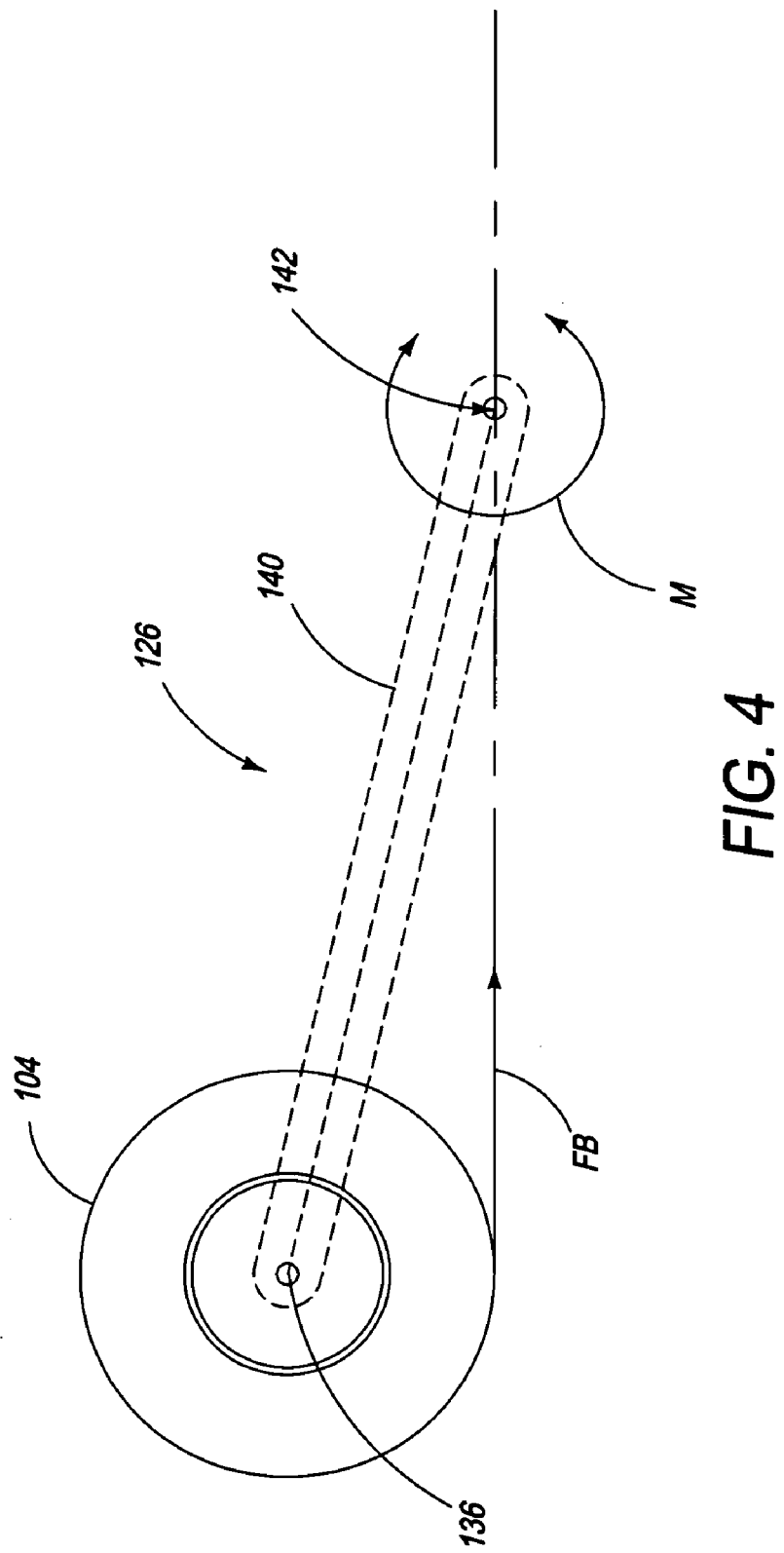
FIG. 4 is a simplified free body diagram including a wheel that is supported by a suspension represented by an imaginary link rotating about an instant center axis.

FIG. 4 is a simplified free body diagram including a wheel 104 that is supported by a suspension 126 represented by an imaginary link 140 rotating about an instant center axis 142.

A braking force vector FB is illustrated with an arrow in FIG. 4. Braking force vector FB represents a braking force applied to wheel 104 during braking of an ATV including wheel 104. In FIG. 4, it may be appreciated that side view instant center axis 142 of suspension 126 is positioned such that braking force vector FB intersects side view instant center axis 142.

Since braking force vector FB intersects instant center axis 142, the moment about instant center axis 142 resulting from braking force FB is substantially zero in the embodiment of FIG. 4.

The moment created about instant center axis 142 is illustrated with an arrow that is labeled M in FIG. 4. As describe above, moment M is substantially zero in the embodiment of FIG. 4. Clockwise or counter clockwise moments urging a pivot axis 136 of wheel 104 to rotate about instant center axis 142 will tend to cause suspension 126 to compress or extend respectively. Since, in the embodiment of FIG. 4, braking force vector FB creates no moment about instant center axis 142, braking force vector FB will preferably not urge suspension 126 to compress or extend.

Figure 5:
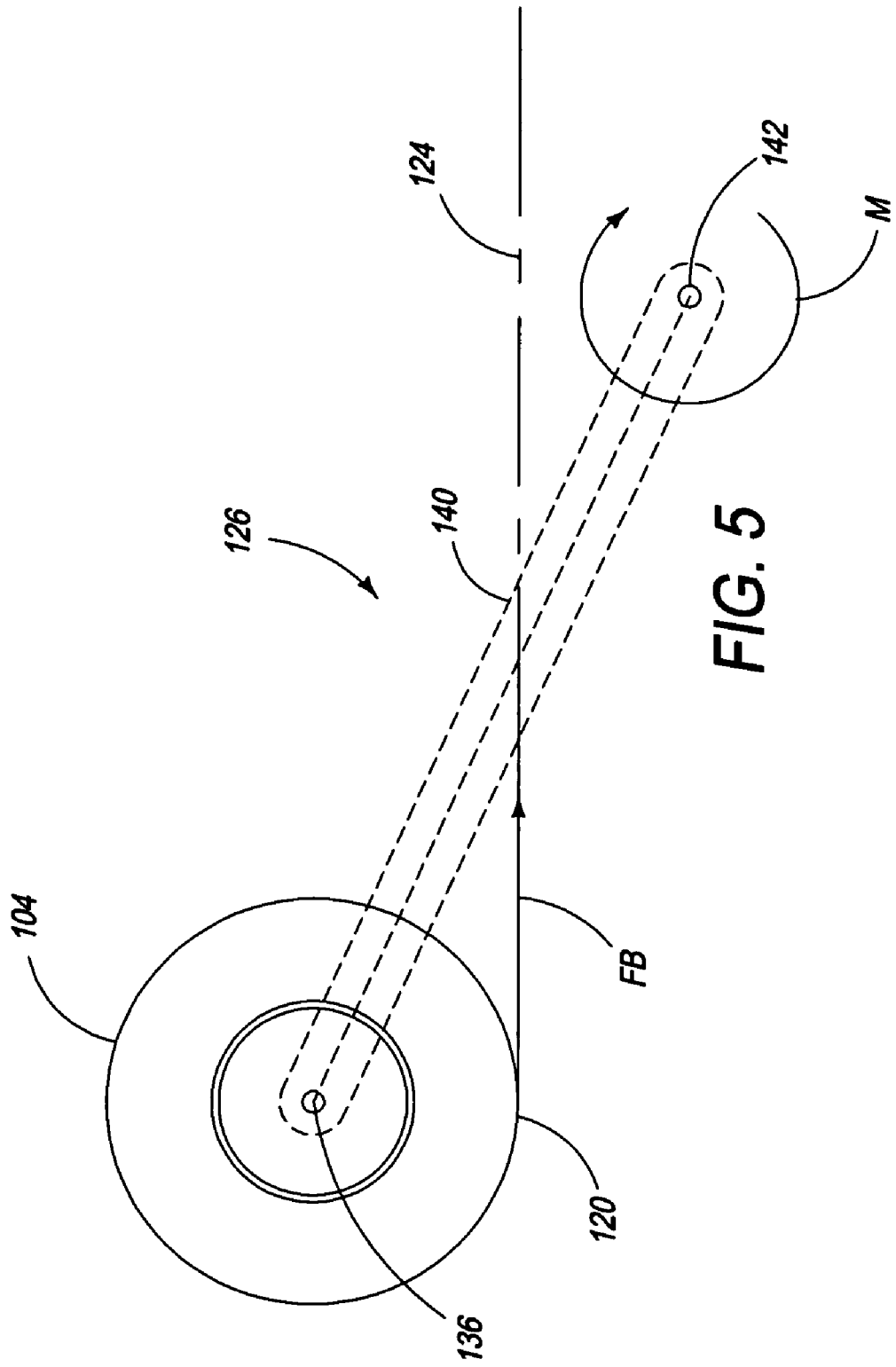
FIG. 5 is a simplified free body diagram including a wheel that is supported by a suspension represented by an imaginary link.

FIG. 5 is a simplified free body diagram including a wheel 104 that is supported by a suspension 126 represented by an imaginary link 140. In FIG. 5, it may be appreciated that an instant center axis 142 of suspension 126 is located below a wheel contact plane 124 which contacts wheel 104 at a momentary contact point 120. In the embodiment of FIG. 5 a braking force vector FB is shown acting on wheel 104. In FIG. 5 it may be appreciated that braking force vector FB will tend to produce a clockwise moment about instant center axis 142.

The moment created about instant center axis 142 by braking force FB is illustrated with an arrow that is labeled M in FIG. 5. With reference to FIG. 5, it may be appreciated that clockwise or counter clockwise moments urging pivot axis 136 of wheel 104 to rotate about instant center axis 142 will tend to cause suspension 126 to compress or extend respectively. Since, in the embodiment of FIG. 5, braking force vector FB creates a clockwise moment about instant center axis 142, braking force vector FB will tend to urge compression of suspension 126.

Figure 6:
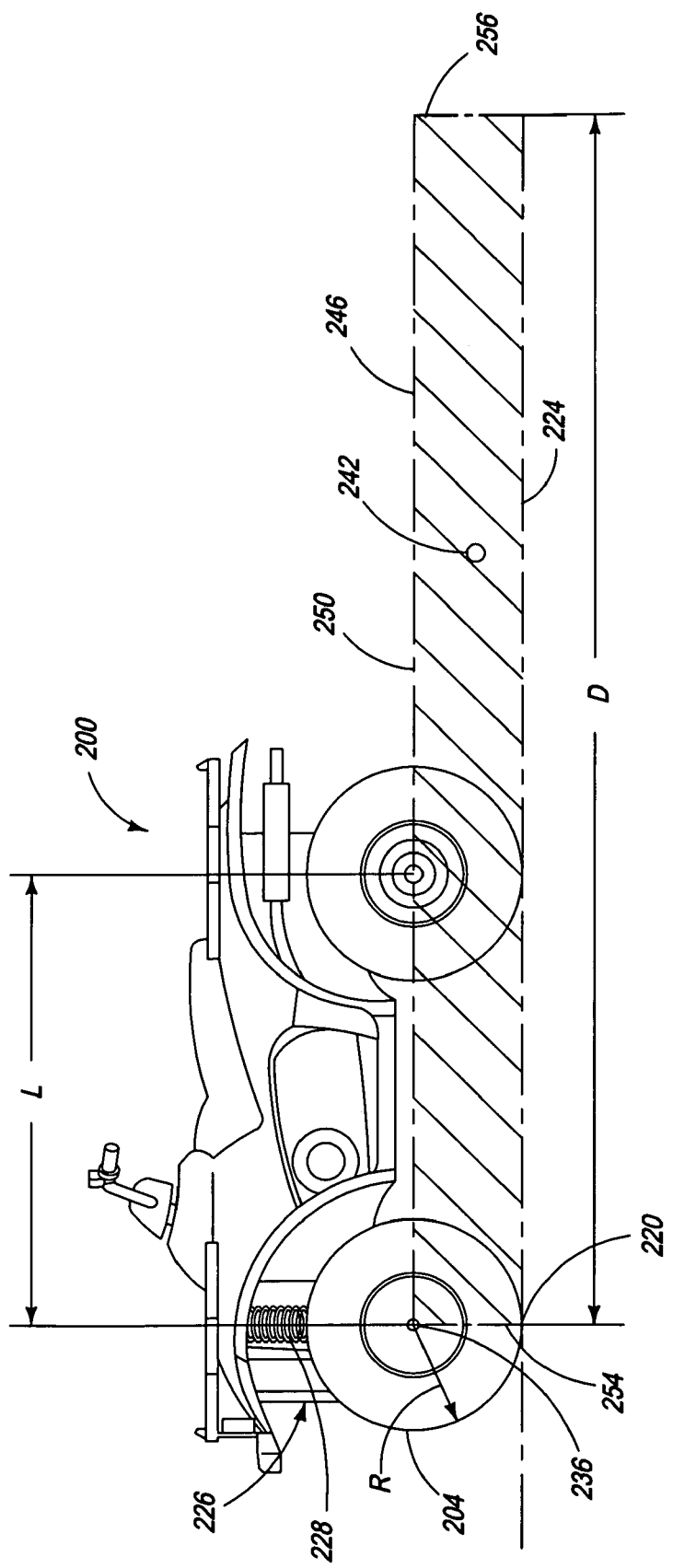
FIG. 6 is a plan view of an ATV in accordance with an exemplary embodiment of the present invention.

FIG. 6 is a plan view of an ATV 200 in accordance with an exemplary embodiment of the present invention. ATV 200 includes a wheel 204 supported by a suspension 226 including a spring assembly 228. In FIG. 6, it may be appreciated that a side view instant center axis 242 of suspension 226 is positioned so that it intersects a strategic region 250. In the embodiment of FIG. 6, strategic region 250 extends between a wheel contact plane 224 and a wheel axis plane 246 intersecting a pivoting axis 236 of wheel 204. It should be noted that strategic region 250 preferably includes wheel contact plane 224 and wheel axis plane 246. Since suspension 226 has a side view instant center axis 242 located below wheel axis plane 246, suspension 226 preferably provides a level of retracting wheel motion. Since suspension 226 has a side view instant center located above wheel contact plane 224, the application of a braking force to wheel 204 will preferably not urge compression of suspension 226.

It may be noted in FIG. 6 that in this exemplary embodiment, wheel axis plane 246 is generally parallel to wheel contact plane 224. In the embodiment of FIG. 6, strategic region 250 is also defined by a front plane 254 and a rear plane 256. In FIG. 6, front plane 254 is shown intersecting pivoting axis 236 and momentary contact point 220 of wheel 204. In the embodiment of FIG. 6, rear plane 256 of strategic region 250 is generally parallel to front plane 254.

In the embodiment of FIG. 6, rear plane 256 is located a distance D behind momentary contact point 220 of wheel 204. In some embodiments of the present invention, the location of rear plane 256 is selected to provide a retracting wheel motion angle which is greater than a selected minimum retracting wheel motion angle. In some useful embodiments, distance D is selected to provide an angle of retracting wheel motion greater than about 0.5 degrees. In some advantageous embodiments, distance D is selected to provide an angle of retracting wheel motion greater than about 3.5 degrees. In some particularly advantageous embodiments, distance D is selected to provide an angle of retracting wheel motion greater than about 7.0 degrees.

In some useful embodiments, distance D is less than about 36 times wheel radius R. In some advantageous embodiments, distance D is less than about 24 times wheel radius R. In some particularly advantageous embodiments, distance D is less than about 12 times wheel radius R.

In some useful embodiments, distance D is less than about 9 times wheel base distance L of ATV 200. In some advantageous embodiments, distance D is less than about 6 times wheel base distance L of ATV 200. In some particularly advantageous embodiments, distance D is less than about 3 times wheel base distance L of ATV 200.

Figure 7:
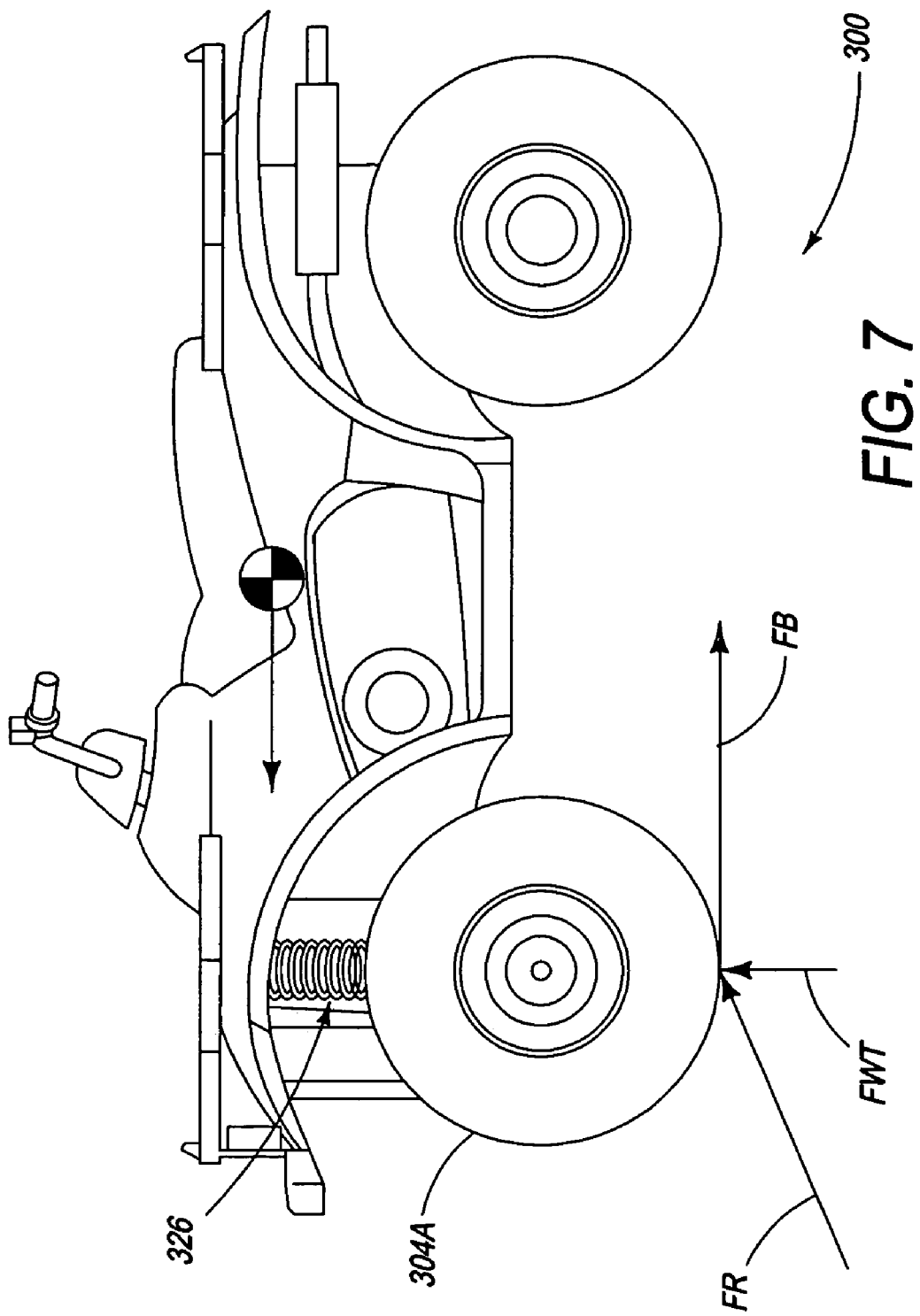
FIG. 7 is a plan view of an ATV having a front wheel that is supported by a suspension.

FIG. 7 is a plan view of an ATV 300 having a front wheel 304A that is supported by a suspension 326. During braking of ATV 300 the weight supported by front wheel 304A may increase due to the momentum the rider and ATV 300. The additional downward force applied to front wheel 304A during braking may be balanced by a reactionary force provided by the ground beneath the front wheels. In FIG. 7, this reactionary force is illustrated with a reference arrow labeled FWT.

FIG. 7 also includes a second reference arrow FB and a third reference arrow FR. Second reference arrow FB represents a braking force applied to front wheel 304A during braking of ATV 300. Third reference arrow FR represents the combined effect of braking force FB and reactionary force FWT.

Figure 8:
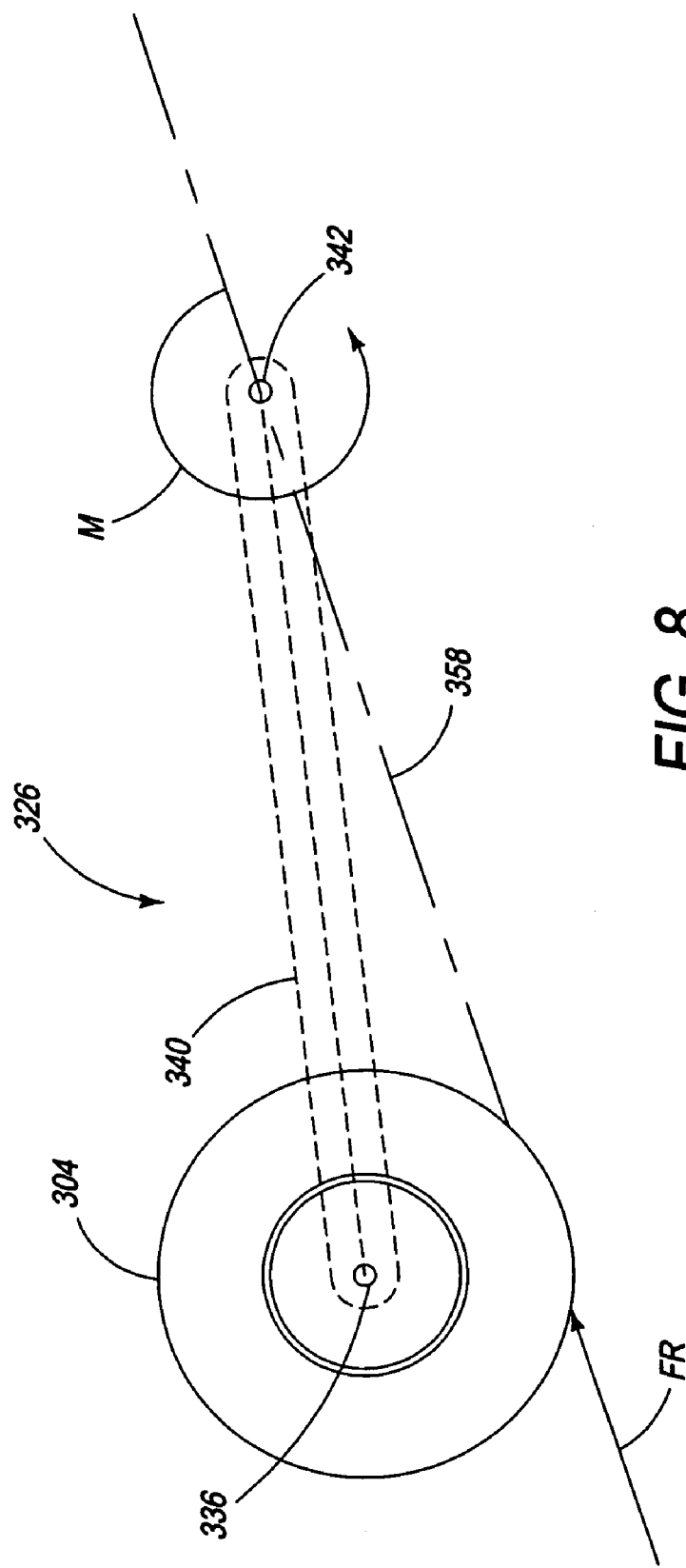
FIG. 8 is a free body diagram including a wheel that is supported by a suspension represented by an imaginary link.

FIG. 8 is a free body diagram including a wheel 304 that is supported by a suspension 326 represented by an imaginary link 340. FIG. 8 also includes a resultant force FR which is represented by an arrow. In the embodiment of FIG. 8, resultant force FR represents the combined effect of a braking force and a reactionary force.

In FIG. 8 it may be appreciated that suspension 326 is dimensioned so that instant center axis 342 of suspension 326 intersects a slope line 358. In the embodiment of FIG. 8, slope line 358 generally lies in line with the direction of resultant force FR. When resultant force FR has a direction intersecting instant center axis 342 the moment about instant center axis 342 resulting from resultant force FR is preferably substantially zero.

The moment created about instant center axis 342 is illustrated with an arrow that is labeled M in FIG. 8. As describe above, moment M is substantially zero in the embodiment of FIG. 8. Clockwise or counter clockwise moments urging a pivot axis 336 of wheel 304 to rotate about instant center axis 342 will tend to cause suspension 326 to compress or extend respectively. Since, in the embodiment of FIG. 8, resultant force vector FR creates no moment about instant center axis 342, resultant force vector FR will preferably not urge suspension 326 to compress or extend.

Thus, in the embodiment of FIG. 8, resultant force FR does not urge suspension 326 to compress or extend by urging rotation of pivot axis 336 of wheel 304 about instant center axis 342. The moment created about instant center axis 342 by resultant force FR is illustrated with an arrow that is labeled M in FIG. 8. As described above, the magnitude of moment M is substantially zero in the embodiment of FIG. 8.

Figure 9:
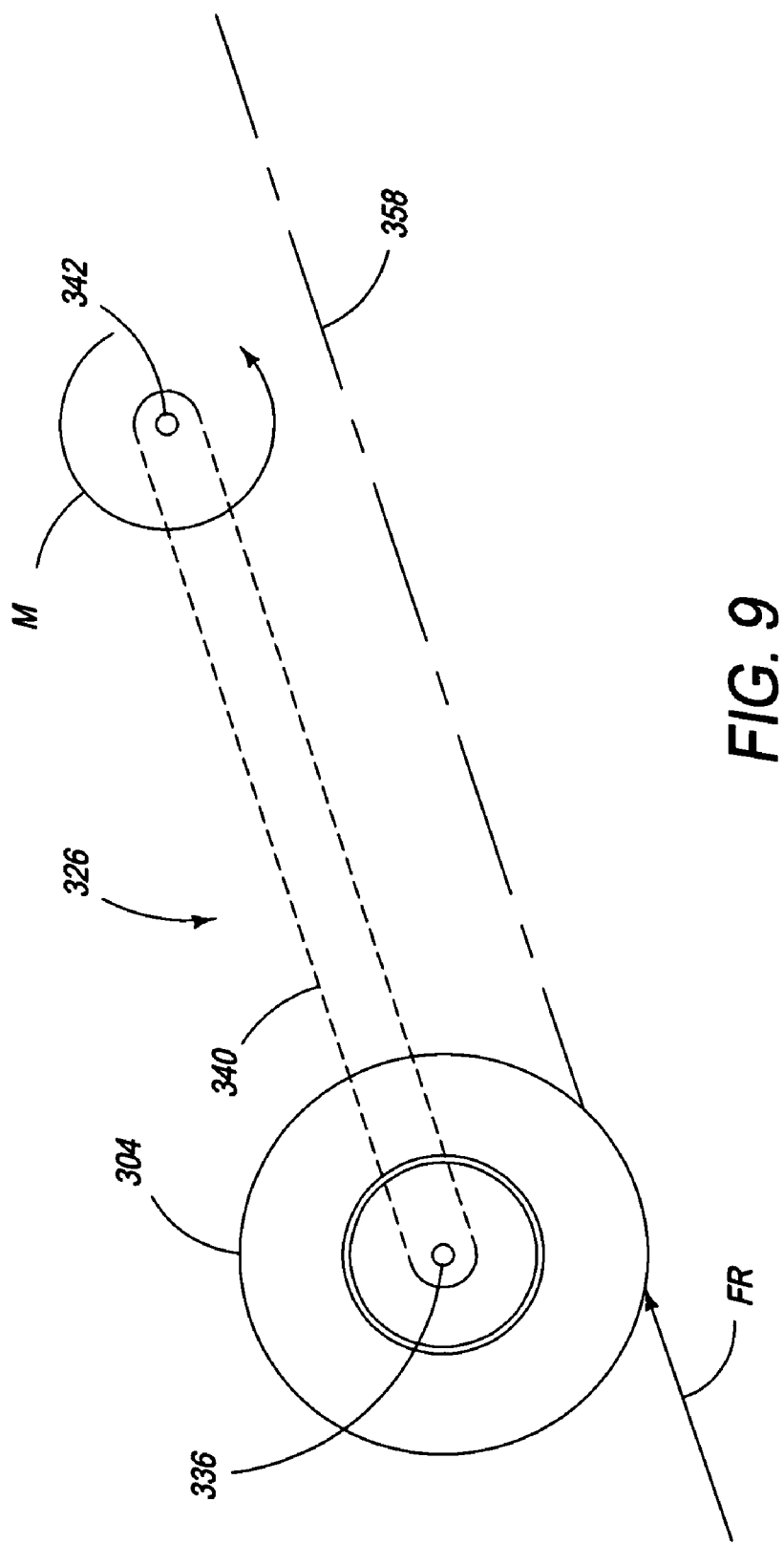
FIG. 9 is a free body diagram including a wheel that is supported by a suspension represented by an imaginary link.

FIG. 9 is a free body diagram including a wheel 304 that is supported by a suspension 326 represented by an imaginary link 340. FIG. 9 also includes a resultant force FR which is represented by an arrow. In the embodiment of FIG. 9, resultant force FR represents the combined effect of a braking force and a reaction force.

In FIG. 9, it may be appreciated that an instant center axis 342 of suspension 326 is located above a slope line 358. In the embodiment of FIG. 9, slope line 358 illustrates the direction of a resultant force FR. In some embodiments of the present invention, the slope of slope line 358 equals H/L. Where L is the wheel base length of an ATV including suspension 326, and where H is the height of the center of mass of the ATV and an ATV rider.

In FIG. 9 it may be appreciated that the resultant force FR created during braking, will produce a moment M about instant center axis 342. In FIG. 9 it may be appreciated that moment M has a counter clockwise direction. With reference to FIG. 9, it may be appreciated that clockwise or counter clockwise moments urging pivot axis 336 of wheel 304 to rotate about instant center axis 342 will tend to cause suspension 326 to compress or extend respectively. Since, in the embodiment of FIG. 9, resultant force vector FR creates a counter clockwise moment about instant center axis 342, resultant force vector FR will tend to urge extension of suspension 326.

Figure 10:
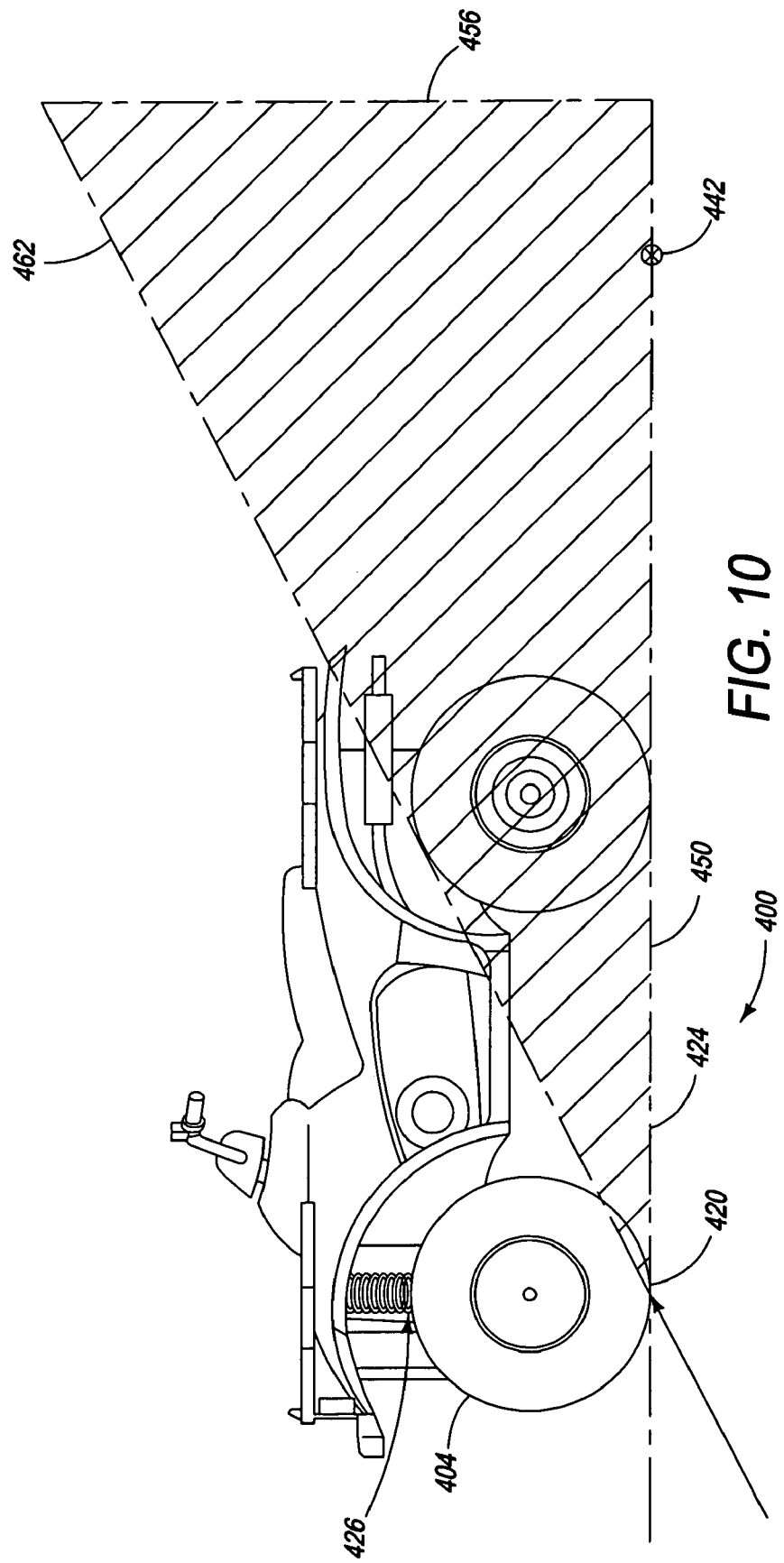
FIG. 10 is a plan view of an ATV in accordance with an exemplary embodiment of the present invention.

FIG. 10 is a plan view of an ATV 400 in accordance with an exemplary embodiment of the present invention. ATV 400 includes a supported wheel 404 supported by a suspension 426. In FIG. 10 a side view instant center axis 442 of suspension 426 is shown intersecting a strategic region 450. In the embodiment of FIG. 10, strategic region 450 extends between a wheel contact plane 424 and a sloped plane 462 intersecting a momentary contact point 420 of supported wheel 404.

In FIG. 10, it may be appreciated that sloped plane 462 has a slope which is substantially equal to the slope of a resultant force FR that is acting on supported wheel 404. In some embodiments of the present invention, the slope of sloped plane 462 equals H/L. Where L is the wheel base length of an ATV including suspension 426, and where H is the height of the center of mass of the ATV and an ATV rider.

Since strategic region 450 extends below sloped plane 462, the application of a resultant force FR to front wheel 404A will preferably not urge suspension 426 to extend. Since strategic region 450 extends above ground contact plane 424, the application of a braking force vector FB to front wheel 404A will preferably not urge suspension 426 to compress.

In the embodiment of FIG. 10, strategic region 450 is also defined by a rear plane 456. In the embodiment of FIG. 10, rear plane 456 of strategic region 450 is generally perpendicular to wheel contact plane 424. In a preferred embodiment, rear plane 456 is located a selected distance behind momentary contact point 420 of supported wheel 404.

Figure 11:
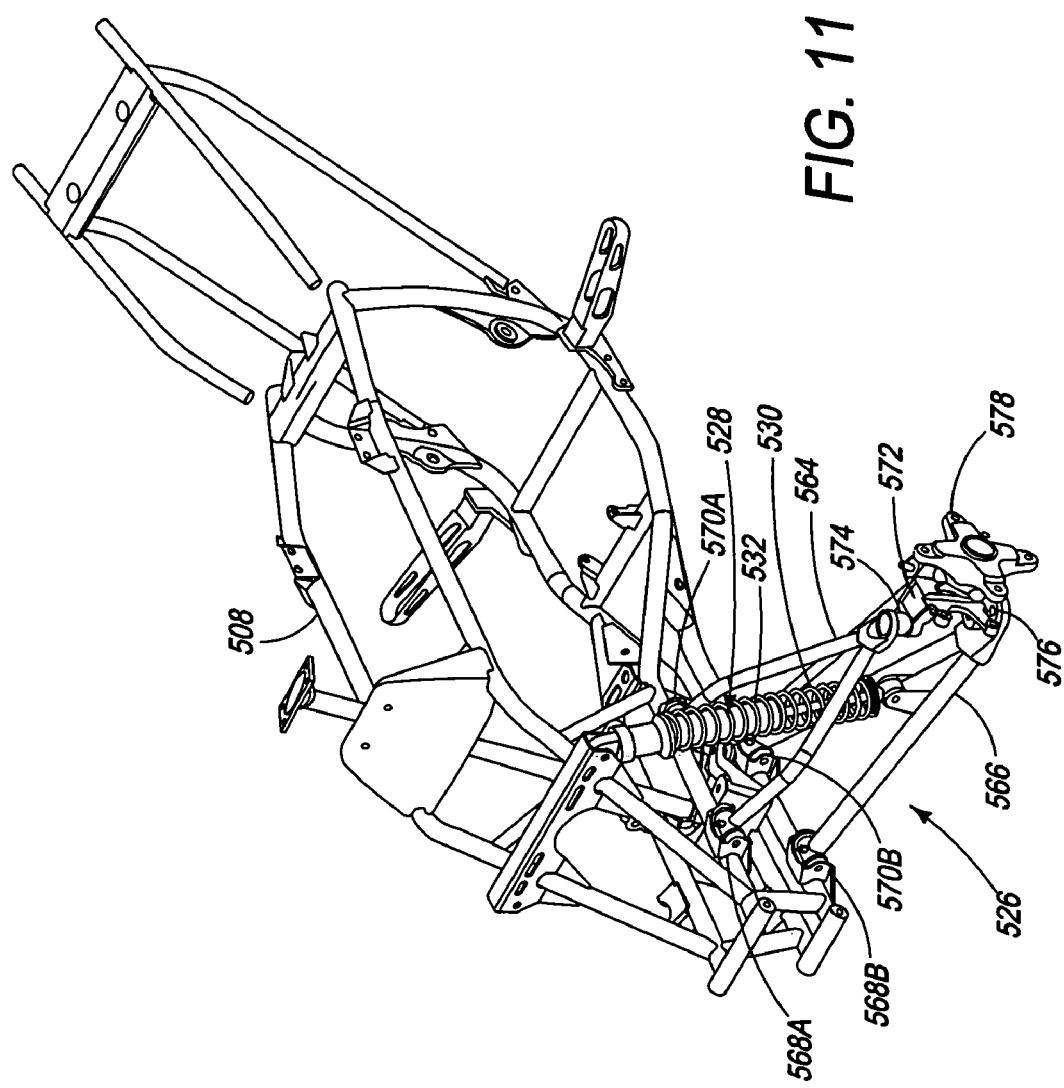
FIG. 11 is a perspective view of an assembly in accordance with an additional exemplary embodiment of the present invention.

FIG. 11 is a perspective view of an assembly in accordance with an additional exemplary embodiment of the present invention. The assembly shown in FIG. 11 includes a frame 508, and a suspension 526 comprising an upper arm 564, and a lower arm 566. In the embodiment of FIG. 11, upper arm 564 is rotatably coupled to frame 508 at a first joint 568A and a second joint 570A. Also in the embodiment of FIG. 11, lower arm 566 is coupled to frame 508 at a first joint 568B and a second joint 570B.

Suspension 526 also includes a wheel carrier 572 that is coupled to upper arm 564 and lower arm 566. In the exemplary embodiment of FIG. 11, an outer end of upper arm 564 is pivotably coupled to an upper portion of wheel carrier 572 at an upper coupling 574. Also in the exemplary embodiment of FIG. 11, an outer end of lower arm 566 is pivotably coupled to a lower portion of wheel carrier 572 at a lower coupling 576. A hub 578 is rotatably coupled to wheel carrier 572 in the embodiment of FIG. 11. In a preferred embodiment, upper coupling 574 and lower coupling 576 each provide three rotational degrees of freedom. Upper coupling 574 and lower coupling 576 may comprise, for example, ball and socket joints.

Suspension 526 includes a spring assembly 528 having a first end rotatably coupled to frame 508 and a second end rotatably coupled to lower arm 566. In the embodiment of FIG. 11, spring assembly 528 includes a shock absorber 532 and a spring 530 that is disposed about shock absorber 532.

Figure 12:
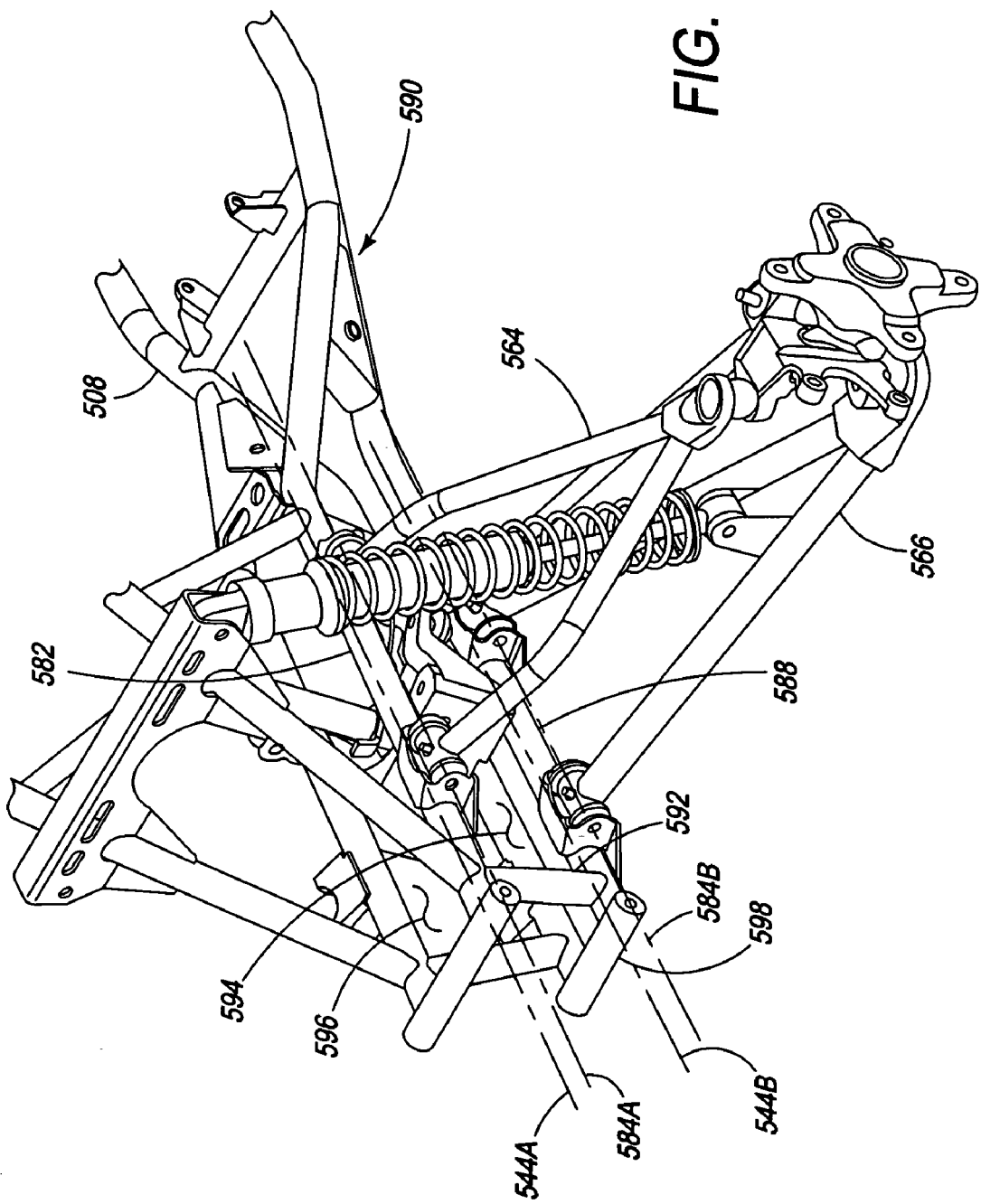
FIG. 12 is an additional perspective view of the assembly shown in the previous figure.

FIG. 12 is an additional perspective view of the assembly shown in the previous figure. In FIG. 12, it may be appreciated that upper arm 564 is rotatably coupled to a first leg 582 of frame 508 such that upper arm 564 rotates about a first rotational axis 584A. A second rotational axis 584B is also illustrated in FIG. 12. Lower arm 566 is rotatably coupled to a second leg 588 of frame 508 such that lower arm 566 rotates about second rotational axis 584B. In the embodiment of FIG. 12, first leg 582 has a first longitudinal axis 544A and second leg 588 has a second longitudinal axis 544B. In the embodiment of FIG. 12, first longitudinal axis 544A is generally parallel to first rotational axis 584A. Also in the embodiment of FIG. 12, second longitudinal axis 544B is generally parallel to second rotational axis 584B.

In the embodiment of FIG. 12, first leg 582 is coupled to second leg 588 at a crotch 590. A riser 592 extends between first leg 582 and second leg 588. In FIG. 12, it may be appreciated that riser 592, first leg 582, and second leg 588 define three sides of a first loop 594 having a generally triangular shape. Frame 508 also includes a second loop 596 that is coupled to first loop 594 by a plurality of cross pieces 598. In the embodiment of FIG. 12, second loop 596 also has a generally triangular shape. An ATV in accordance with a preferred embodiment of the present invention includes a second upper arm rotatably coupled to a first leg of second loop 596 and a second lower arm rotatable coupled to a second leg of second loop 596.

Figure 13:
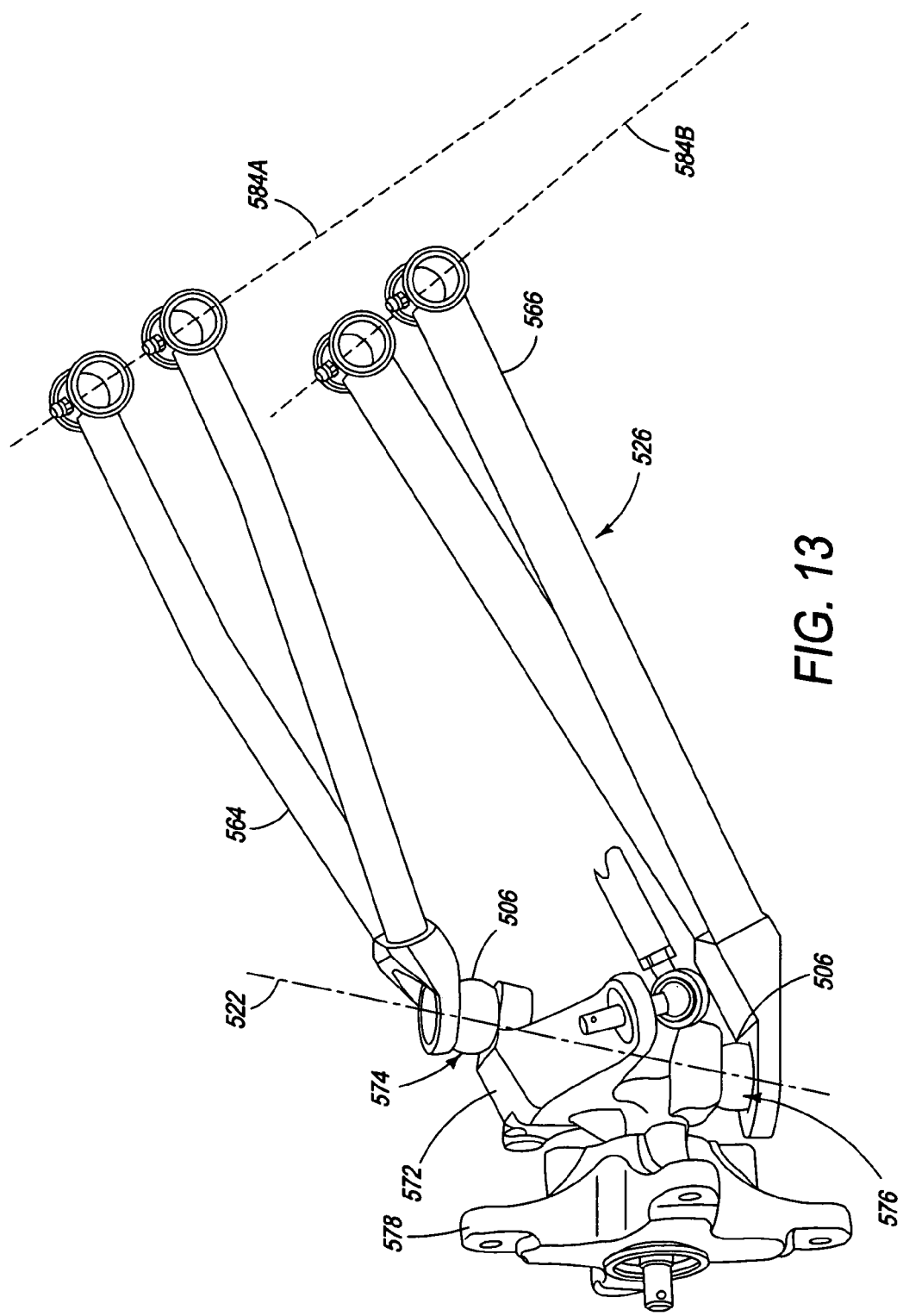
FIG. 13 is a perspective view of a suspension in accordance with an exemplary embodiment of the present invention.

FIG. 13 is a perspective view of a suspension 526 in accordance with an exemplary embodiment of the present invention. Suspension 526 of FIG. 13 includes an upper arm 564 and a lower arm 566. In the embodiment of FIG. 13, suspension 526 is configured such that upper arm 564 rotates about a first rotational axis 584A. In FIG. 13, first rotational axis 584A is represented with a dashed line. Also in the embodiment of FIG. 13, lower arm 566 rotates about a second rotational axis 584B.

Suspension 526 of FIG. 13 also includes a wheel carrier 572 that is coupled to upper arm 564 and lower arm 566. In the exemplary embodiment of FIG. 13, an outer end of upper arm 564 is pivotably coupled to an upper portion of wheel carrier 572 at an upper coupling 574. Also in the exemplary embodiment of FIG. 13, an outer end of lower arm 566 is pivotably coupled to a lower portion of wheel carrier 572 at a lower coupling 576.

In the embodiment of FIG. 13, upper coupling 574 and lower coupling 576 comprise ball joints 506. Ball joints 506 preferably provide three rotational degrees of freedom. The rotational degrees of freedom provided by ball joints 506 allow suspension 526 to move between a full compression position and a full extension provision and at the same time allow wheel carrier 572 to rotate about a steering axis 522. In the embodiment of FIG. 13, suspension 526 is shown in an intermediate position lying between the full extension position and the full compression position. In some embodiments, the assembly of FIG. 13 may also include a steering system that is configured to rotate wheel carrier 572 about steering axis 522. A tie rod of such a steering system may be seen in FIG. 13.

In the embodiment of FIG. 13, upper arm 564 has a first length and a lower arm 566 has a second length different from the first length. Embodiments of suspension 526 are also possible in which upper arm 564 and lower arm 566 have substantially the same length.

Figure 14:
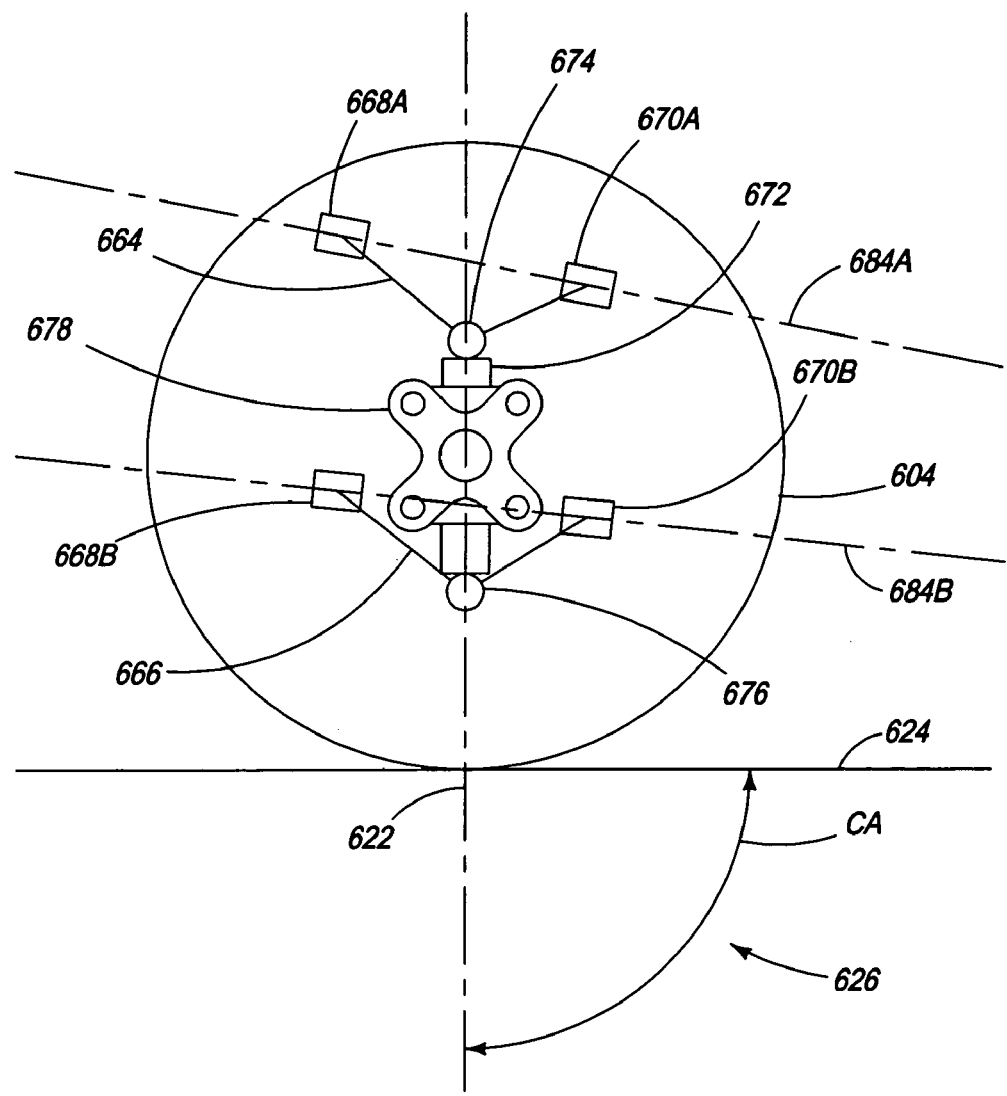
FIG. 14 is a diagrammatic plan view of a suspension in accordance with an additional exemplary embodiment of the present invention.

FIG. 14 is a diagrammatic plan view of a suspension 626 in accordance with an additional exemplary embodiment of the present invention. In FIG. 14, it may be appreciated that suspension 626 includes a wheel carrier 672 for rotatably supporting wheel 604. A hub 678 is rotatably coupled to wheel carrier 672 in the embodiment of FIG. 14.

Wheel carrier 672 is coupled to an upper arm 664 of suspension 626 at an upper coupling 674. In FIG. 14 it may also be appreciated that wheel carrier 672 is coupled to a lower arm 666 of suspension 626 at a lower coupling 676. In a preferred embodiment, upper coupling 674 and lower coupling 676 each provide three rotational degrees of freedom. Upper coupling 674 and lower coupling 676 may comprise, for example, ball and socket joints.

In the embodiment of FIG. 14, upper arm 664 is preferably rotatably coupled to a frame at a first joint 668A and a second joint 670A such that upper arm 664 rotates about a rotational axis 684A. In FIG. 14, rotational axis 684A is represented with a dashed line. Also in the embodiment of FIG. 14, lower arm 666 is preferably coupled to a frame at a first joint 668B and a second joint 670B. In the embodiment of FIG. 14, lower arm 666 rotates about a rotational axis 684B. In some embodiments, rotational axis 684A and rotational axis 684B appear to intersect when seen in a side view. In these embodiments, the apparent intersection of rotational axis 684A and rotational axis 684B may define the location of a side view instant center axis 642 of suspension 626.

In FIG. 14, a steering axis 622 of suspension 626 is shown intersecting upper coupling 674 and lower coupling 676. In FIG. 14, a caster angle CA is shown disposed between steering axis 622 and a wheel contact plane 624. In a preferred embodiment, suspension 626 is adapted to deflect so that supported wheel 604 can travel between a full compression position and a full extension position. In the embodiment of FIG. 14, supported wheel 604 is shown in an intermediate position lying between the full extension position and the full compression position.

Figure 15:
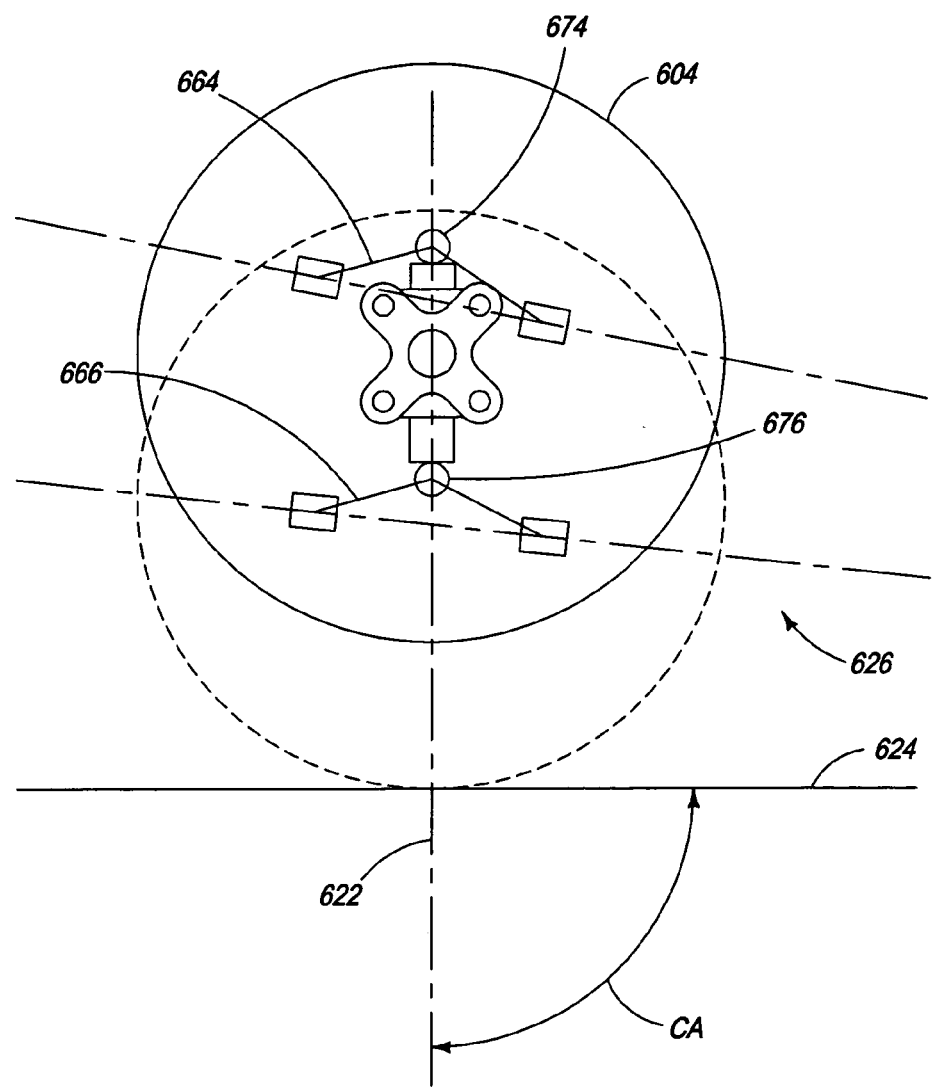
FIG. 15 is an additional diagrammatic plan view showing wheel and suspension from the previous figure In the embodiment of FIG. 15, suspension has been deflected so as to assume a full compression position.

FIG. 15 is an additional diagrammatic plan view showing wheel 604 and suspension 626 from the previous figure. In the embodiment of FIG. 15, suspension 626 has been deflected so as to assume a full compression position. Accordingly, wheel 604, upper arm 664, and lower arm 666 are all shown in their respective full compression positions in FIG. 15. The intermediate position of wheel 604 is shown with a dashed line in FIG. 15.

In FIG. 15, steering axis 622 of suspension 626 is shown intersecting upper coupling 674 and lower coupling 676 of suspension 626. In FIG. 15, a caster angle CA is shown disposed between steering axis 622 and wheel contact plane 624. In the embodiment of FIG. 15, the caster angle of the steering axis associated with the full compression position is generally larger than the caster angle of the steering axis associated with the intermediate position shown in the previous figure.

Figure 16:
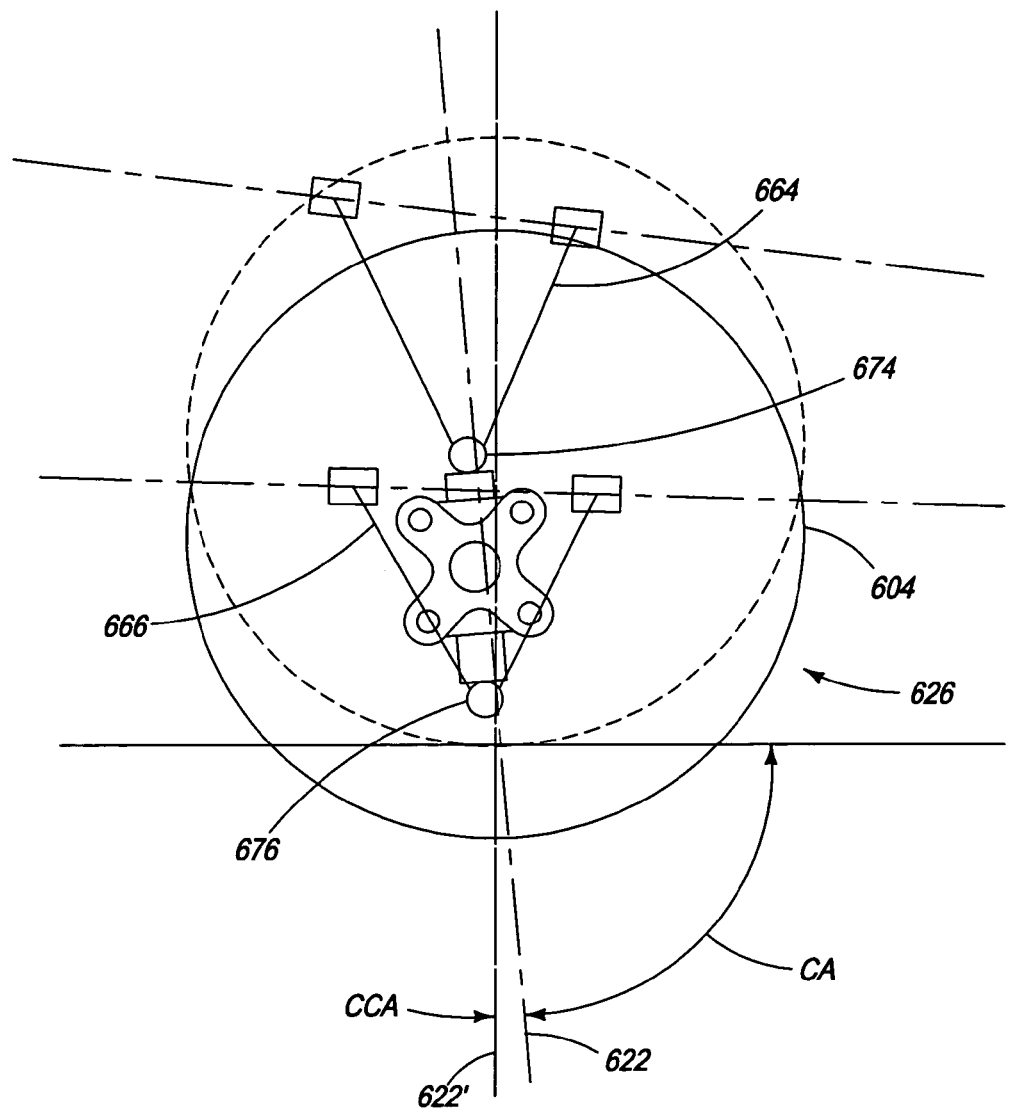
FIG. 16 is an additional diagrammatic plan view showing wheel and suspension from the previous figure.

FIG. 16 is an additional diagrammatic plan view showing wheel 604 and suspension 626 from the previous figure. In the embodiment of FIG. 16, suspension 626 has been deflected so as to assume a full extension position. Accordingly, wheel 604, upper arm 664, and lower arm 666 are all shown in their respective full extension positions in FIG. 16. The intermediate position of wheel 604 is shown with a dashed line in FIG. 16.

In FIG. 16, steering axis 622 of suspension 626 is shown intersecting upper coupling 674 and lower coupling 676. In FIG. 16, a caster angle CA is shown disposed between steering axis 622 and wheel contact plane 624. In the embodiment of FIG. 16, the caster angle of the steering axis associated with the full extension position is generally smaller than the caster angle of the steering axis associated with the intermediate position.

The full compression position of the steering axis is also shown in FIG. 16 (designated steering axis 622'). A caster change angle CCA is defined by the full extension position of steering axis 622 and the full compression position of steering axis 622. An excessive level of caster change during suspension travel may cause the rider of an ATV to receive excessive feedback through the steering system. A suspension having a more forwardly located side view instant center may exhibit more caster change, and a suspension having a more rearwardly located side view instant center may exhibit less caster change. Since the location of the side view instant center may effect the amount of caster change which occurs during travel of the suspension, a method in accordance with the present invention may include the steps of selecting a maximum caster change angle and selecting a location for a front side of a strategic region which provides a caster change angle that is less than the selected maximum caster change angle.

Figure 17:
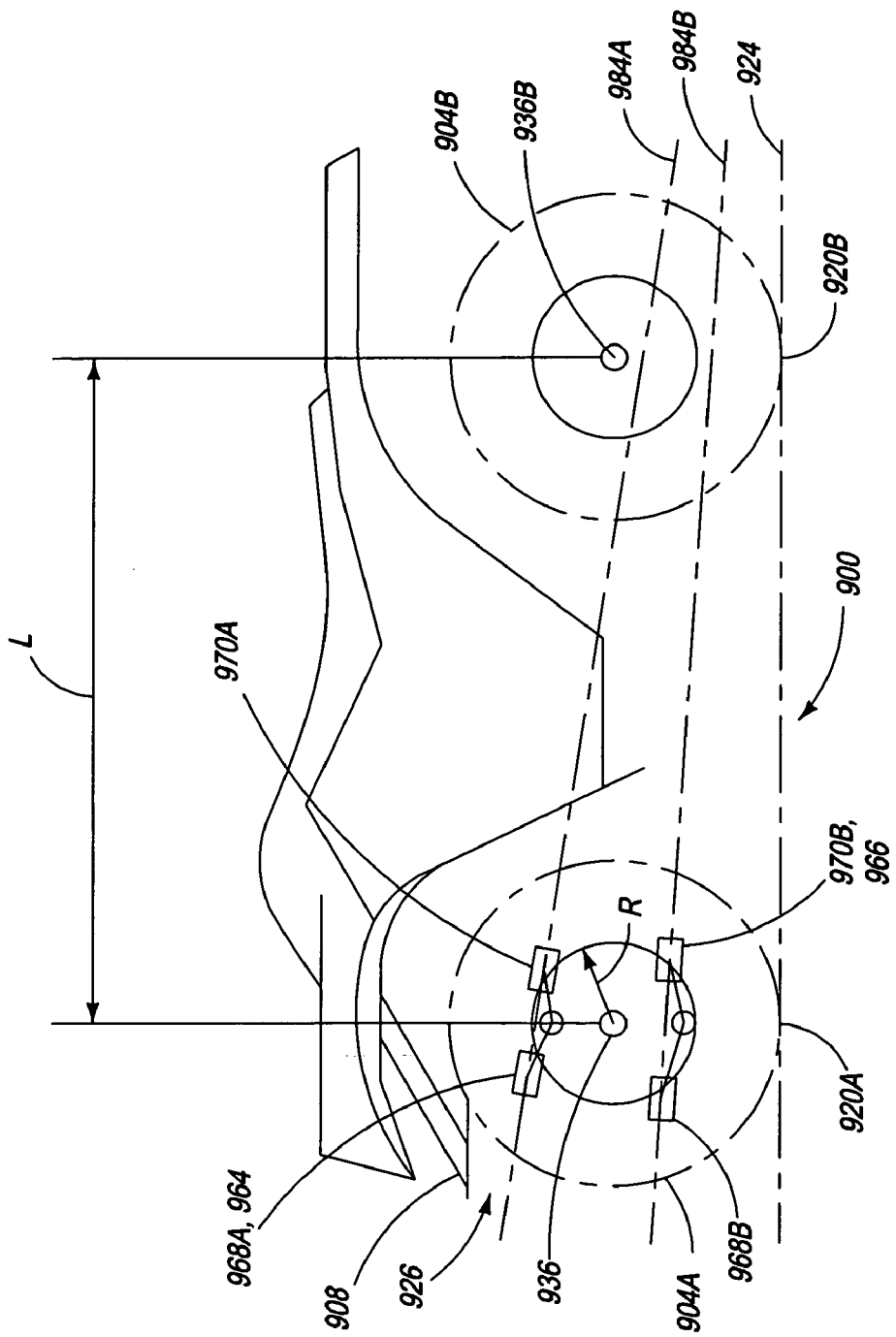
FIG. 17 is a diagrammatic plan view of an ATV in accordance with an exemplary embodiment of the present invention.

FIG. 17 is a diagrammatic plan view of an ATV 900 in accordance with an exemplary embodiment of the present invention. ATV 900 of FIG. 17 preferably includes two front wheels and two rear wheels. One front wheel 904A and one rear wheel 904B of ATV 900 are shown in the plan view of FIG. 17. Front wheel 904A and rear wheel 904B have a pivoting axis 936A and a pivoting axis 936B respectively. In the embodiment of FIG. 17, pivoting axis 936A of front wheel 904A is separated from the pivoting axis 936B of rear wheel 904B by a wheel base distance L. Also in the embodiment of FIG. 17, front wheel 904A has a radius R. Front wheel 904A and rear wheel 904B have a momentary contact point 920A and a momentary contact point 920B respectively. The momentary contact points of the wheels define a wheel contact plane 924.

In the embodiment of FIG. 17, front wheel 904A is coupled to a frame 908 of ATV 900 by a suspension 926. Suspension 926 of FIG. 17 includes an upper arm 964 and a lower arm 966. In the embodiment of FIG. 17, upper arm 964 is rotatably coupled to frame 908 at a first joint 968A and a second joint 970A such that upper arm 964 rotates about a rotational axis 984A. In FIG. 17, rotational axis 984A is represented with a dashed line. Also in the embodiment of FIG. 17, lower arm 966 is coupled to frame 908 at a first joint 968B and a second joint 970B. In the embodiment of FIG. 17, lower arm 966 rotates about a rotational axis 984B. In FIG. 17, rotational axis 984A and rotational axis 984B intersect to define a side view instant center axis 942 of suspension 926. In the embodiment of FIG. 17, rotational axis 984A and rotational axis 984B each define an angle with wheel contact plane 924.

Figure 18:
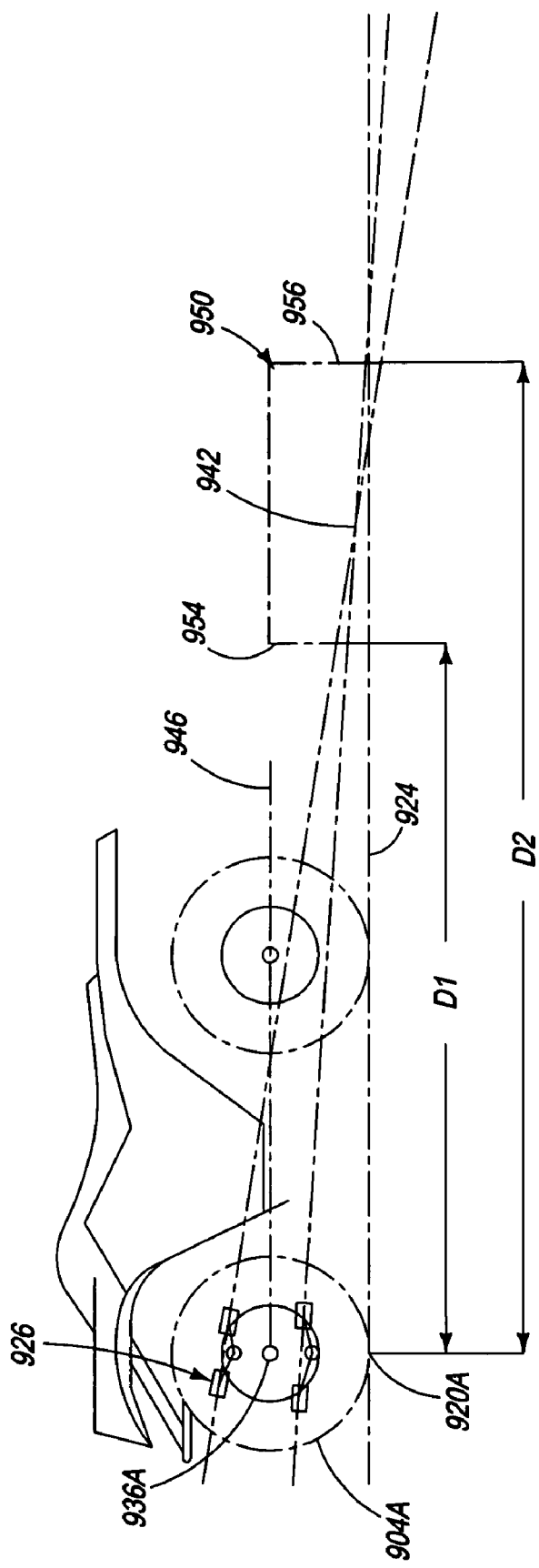
FIG. 18 is an additional plan view of ATV of the preceding figure.

FIG. 18 is an additional plan view of ATV 900 of the preceding figure. In FIG. 18 it may be appreciated that suspension 926 is configured such that an instant center axis 942 of suspension 926 intersects a strategic region 950. In the embodiment of FIG. 18, strategic region 950 has a generally rectangular shape including four sides.

In the embodiment of FIG. 18, strategic region 950 extends between a wheel contact plane 924 and a wheel axis plane 946. In the embodiment of FIG. 18, wheel axis plane 946 is positioned so that it intersects a pivoting axis 936A of right front wheel 904A. In FIG. 18, it may be appreciated that wheel axis plane 946 is generally parallel to wheel contact plane 924. In a preferred embodiment, strategic region 950 includes wheel contact plane 924 and a wheel axis plane 946.

In the embodiment of FIG. 18, strategic region 950 is further defined by a front plane 954 and a rear plane 956. In FIG. 18 it may be appreciated that front plane 954 intersects wheel contact plane 924 at a point located a first distance D1 rearward of momentary contact point 920A of the right front wheel 904A. In some embodiments of the present invention, the location of front plane 954 is selected to provide a caster change angle which is less than a selected maximum caster change angle.

In some useful embodiments, first distance D1 is selected to provide a caster change angle less than about 18.0 degrees. In some advantageous embodiments, first distance D1 is selected to provide a caster change angle less than about 12.0 degrees. In some particularly advantageous embodiments, first distance D1 is selected to provide a caster change angle less than about 6.0 degrees.

In some useful embodiments, first distance D1 is greater than about 4 times wheel radius R of ATV 900. In some advantageous embodiments, first distance D1 is greater than about 7 times wheel radius R of ATV 900. In some particularly advantageous embodiments, first distance D1 is greater than about 10 times wheel radius R of ATV 900.

In some useful embodiments, first distance D1 is greater than about 1 times wheel base distance L of ATV 900. In some advantageous embodiments, first distance D1 is greater than about 2 times wheel base distance L of ATV 900. In some particularly advantageous embodiments, first distance D1 is greater than about 2.5 times wheel base distance L of ATV 900.

In FIG. 18, it may be appreciated that rear plane 956 intersects wheel contact plane 924 at a point located a second distance D2 rearward of momentary contact point 920 of front wheel 904A. In some embodiments of the present invention, the location of rear plane 956 is selected to provide a retracting wheel motion angle which is greater than a selected minimum retracting wheel motion angle. In some useful embodiments, second distance D2 is selected to provide a retracting wheel motion angle greater than about 0.5 degrees. In some advantageous embodiments, second distance D2 is selected to provide a retracting wheel motion angle greater than about 3.5 degrees. In some particularly advantageous embodiments, second distance D2 is selected to provide a retracting wheel motion angle greater than about 7.0 degrees.

In some useful embodiments, second distance D2 is less than about 36 times wheel radius R of ATV 900. In some advantageous embodiments, second distance D2 is less than about 24 times wheel radius R of ATV 900. In some particularly advantageous embodiments, second distance D2 is less than about 12 times wheel radius R of ATV 900.

In some useful embodiments, second distance D2 is less than about 9 times wheel base distance L of ATV 900. In some advantageous embodiments, second distance D2 is less than about 6 times wheel base distance L of ATV 900. In some particularly advantageous embodiments, second distance D2 is less than about 3 times wheel base distance L of ATV 900.

As described above, a suspension in accordance with the present invention preferably has a side view instant center axis which intersects a strategic region. Methods in accordance with the present invention may be used to define the boundaries of the strategic region. A method in accordance with the present invention may includes the steps of 1) identifying a bottom side of a strategic region, 2) identifying a top side of the strategic region, 3) identifying a front side of the strategic region, and 4) identifying a rear side of the strategic region.

In some methods in accordance with the present invention the step of identifying the bottom side of the strategic region may include the steps of identifying a wheel contact plane defined by the momentary contact points of the wheels of the ATV, and identifying a bottom side which overlays the wheel contact plane.

In some methods in accordance with the present invention the step of identifying the top side of the strategic region may include the steps of identifying a wheel axis plane which intersects a pivot axis of a wheel of the ATV, and identifying a side of the strategic region which overlays the wheel axis plane.

In some methods in accordance with the present invention the step of identifying the front side of the strategic region may include the steps of selecting a maximum caster change angle, and selecting a location for the front side of the strategic region which provides a caster change angle that is less than the selected maximum caster change angle.

In some methods in accordance with the present invention the step of identifying the rear side of the strategic region may include the steps of selecting a minimum retracting wheel motion angle, and selecting a location for the rear side of the strategic region which provides a retracting wheel motion angle that is greater than the selected minimum retracting wheel motion angle.

Figure 19:
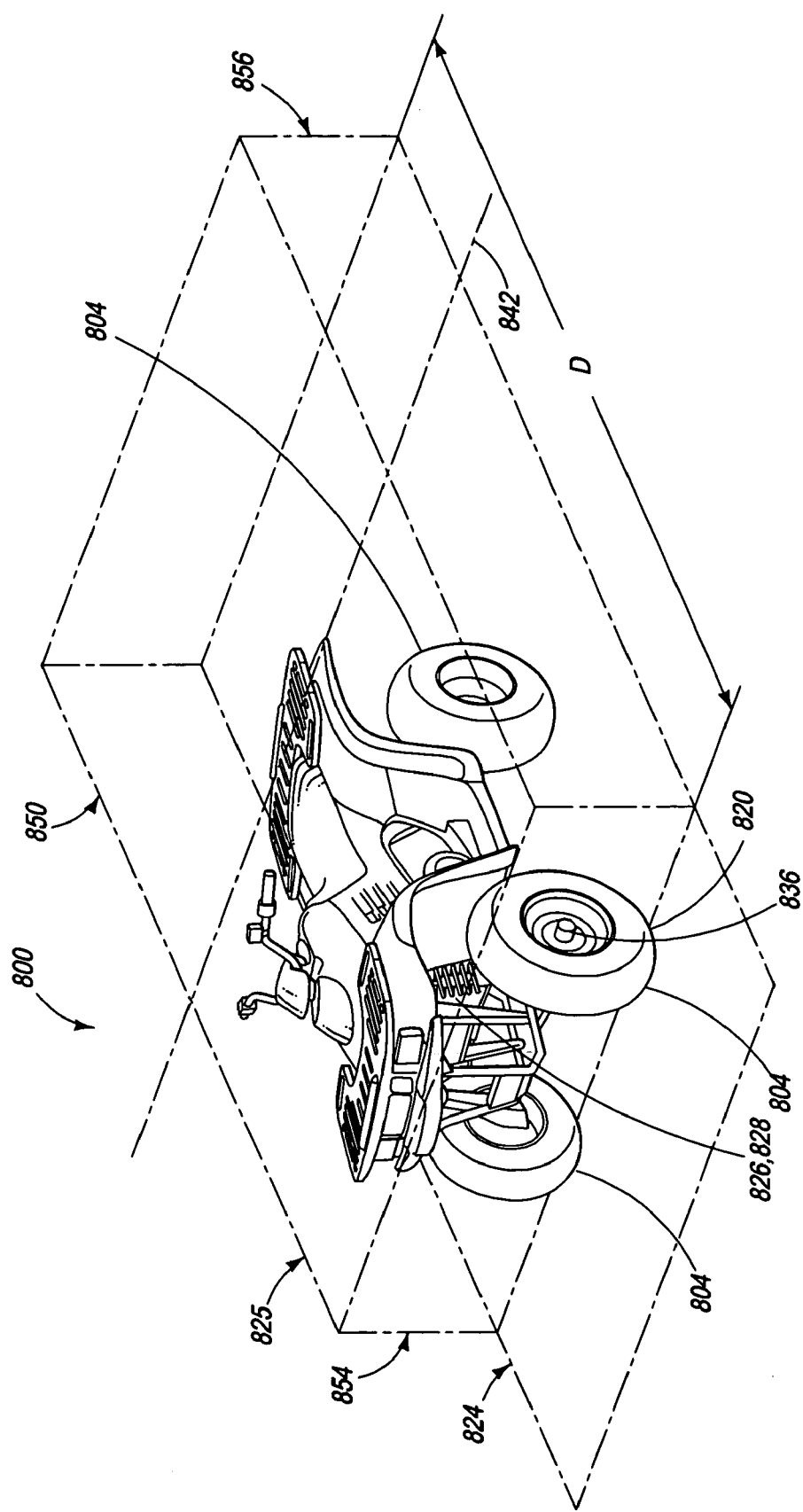
FIG. 19 is a plan view of an ATV in accordance with an additional exemplary embodiment of the present invention.

FIG. 19 is a plan view of an ATV 800, in accordance with an additional exemplary embodiment of the present invention. ATV 800 includes a plurality of wheels 804. A suspension 826 including a spring assembly 828 is shown supporting one wheel 804. In FIG. 19, it may be appreciated that a side view instant center axis 842 of suspension 826 is positioned so that it intersects a strategic region 850. In the embodiment of FIG. 19, strategic region 850 extends between a wheel contact plane 824 and a wheel top plane 825. In the embodiment of FIG. 19, wheel top plane 825 is defined by the tops of wheels 804. It should be noted that strategic region 850 preferably includes wheel contact plane 824 and wheel top plane 825.

In the embodiment of FIG. 19, strategic region 850 is also defined by a front plane 854 and a rear plane 856. In FIG. 19, front plane 854 is shown intersecting a pivoting axis 836 and a momentary contact point 820 of a wheel 804. In the embodiment of FIG. 19, rear plane 856 of strategic region 850 is generally parallel to front plane 854. In the embodiment of FIG. 19, rear plane 856 is located a distance D behind momentary contact point 820 of wheel 804.

Numerous characteristics and advantages of the invention covered by this document have been set forth in the foregoing description. It will be understood, however, that this disclosure is, in many respects, only illustrative. Changes may be made in details, particularly in matters of shape, size and ordering of steps without exceeding the scope of the invention. The invention's scope is, of course, defined in the language in which the appended claims are expressed.

What is claimed is:

1. An all terrain vehicle (ATV) having at least one front wheel and at least one rear wheel, each wheel having a momentary contact point, the momentary contact points of the wheels defining a wheel contact plane of the ATV, the ATV comprising:
    a frame;
    a wheel carrier for rotatably supporting a supported wheel having a wheel radius;
    a suspension comprising an upper arm coupled to the wheel carrier at an upper coupling and a lower arm coupled to the wheel carrier at a lower coupling;
    the upper arm being rotatably coupled to the frame at an upper joint such that the upper arm rotates about an upper rotational axis;
    the lower arm being rotatably coupled to the frame at a lower joint such that the lower arm rotates about a lower rotational axis;
    the upper rotational axis and the lower rotational axis crossing one another to define a side view instant center axis of the suspension;
    the side view instant center axis intersecting a strategic region having a generally rectangular shape including four sides;
    a first side of the strategic region overlaying the wheel contact plane of the ATV;
    a second side of the strategic region being generally parallel to the first side and intersecting a pivoting axis of the supported wheel;
    a third side of the strategic region extending between the pivoting axis of the supported wheel, and the momentary contact point of the supported wheel; and
    a fourth side of the strategic region being generally parallel to the third side of the strategic region, and being located a predetermined distance behind the momentary contact point of the supported wheel.

2. The ATV of claim 1, wherein:
    the upper arm and the lower arm direct the supported wheel in a retracting direction during compression of the suspension;
    the retracting direction is skewed by an angle of retracting wheel motion relative to a reference plane that is perpendicular to the wheel contact plane; and
    the angle of retracting wheel motion is greater than about 0.5 degrees.

3. The ATV of claim 2, wherein the angle of retracting wheel motion is greater than about 3.5 degrees.

4. The ATV of claim 3, wherein the angle of retracting wheel motion is greater than about 7.0 degrees.

5. The ATV of claim 1, wherein the predetermined distance is less than about 36 times the radius of the supported wheel.

6. The ATV of claim 5, wherein the predetermined distance is less than about 24 times the radius of the supported wheel.

7. The ATV of claim 6, wherein the predetermined distance is less than about 12 times the radius of the supported wheel.

8. The ATV of claim 1, wherein the predetermined distance is less than about 9 times a wheel base distance of the ATV.

9. The ATV of claim 8, wherein the predetermined distance is less than about 6 times a wheel base distance of the ATV.

10. The ATV of claim 9, wherein the predetermined distance is less than about 3 times a wheel base distance of the ATV.

11. The ATV of claim 1, wherein the supported wheel is a front wheel.

12. An all terrain vehicle (ATV) having at least one front wheel and at least one rear wheel, each wheel having a momentary contact point, the momentary contact points of the wheels defining a wheel contact plane of the ATV, the ATV comprising:
    a frame;
    a wheel carrier for rotatably supporting a supported wheel having a wheel radius;
    a suspension comprising an upper arm coupled to the wheel carrier at an upper coupling and a lower arm coupled to the wheel carrier at a lower coupling;
    the upper arm being rotatably coupled to the frame at an upper joint such that the upper arm rotates about an upper rotational axis;
    the lower arm being rotatably coupled to the frame at a lower joint such that the lower arm rotates about a lower rotational axis;

the upper rotational axis and the lower rotational axis crossing one another to define a side view instant center axis of the suspension;

the side view instant center axis intersecting a strategic region;

a first side of the strategic region overlaying the wheel contact plane of the ATV;

a second side of the strategic region being generally parallel to the first side and intersecting a top of the supported wheel;

a third side of the strategic region extending between the momentary contact point of the supported wheel and the top of the supported wheel; and a fourth side of the strategic region being generally parallel to the third side of the strategic region, and being located a predetermined distance behind the momentary contact point of the supported wheel.

13. An all terrain vehicle (ATV) having at least one front wheel and at least one rear wheel, each wheel having a momentary contact point, the momentary contact points of the wheels defining a wheel contact plane of the ATV, the ATV comprising:

a frame;

a wheel carrier for rotatably supporting a supported wheel having a wheel radius;

a suspension comprising an upper arm coupled to the wheel carrier at an upper coupling and a lower arm coupled to the wheel carrier at a lower coupling;

the upper arm being rotatable coupled to the frame at an upper joint such that the upper arm rotates about an upper rotational axis;

the lower arm being rotatable coupled to the frame at a lower joint such that the lower arm rotates about a lower rotational axis;

the upper rotational axis and the lower rotational axis crossing one another to define a side view instant center axis of the suspension;

the side view instant center axis intersecting a strategic region; and the strategic region extending between the wheel contact plane and a wheel axis plane intersecting a pivoting axis of the supported wheel, wherein the wheel axis plane is generally parallel to the wheel contact plane.

14. The ATV of claim 13, wherein the strategic region is further defined by a front plane and a rear plane;

the front plane intersecting the wheel contact plane at a point located a first distance rearward of the momentary contact point of the supported wheel; and the rear plane intersecting the wheel contact plane at a point located a second distance rearward of the momentary contact point of the supported wheel.

15. The ATV of claim 14, wherein an angular orientation of the wheel carrier changes by less than about 18.0 degrees as the arms move between their full compression positions and their full extension positions.

16. The ATV of claim 15, wherein the angular orientation of the wheel carrier changes by less than about 12.0 degrees as the arms move between their full compression positions and their full extension positions.

17. The ATV of claim 16, wherein the angular orientation of the wheel carrier changes by less than about 6.0 degrees as the arms move between their full compression positions and their full extension positions.

18. The ATV of claim 14, wherein the first distance is greater than about 4 times the wheel radius.

19. The ATV of claim 18, wherein the first distance is greater than about 7 times the wheel radius.

20. The ATV of claim 19, wherein the first distance is greater than about 10 times the wheel radius.

21. The ATV of claim 14, wherein the first distance is greater than about 1 times a wheel base distance of the ATV.

22. The ATV of claim 21, wherein the first distance is greater than about 2 times a wheel base distance of the ATV.

23. The ATV of claim 22, wherein the first distance is greater than about 2.5 times a wheel base distance of the ATV.

24. The ATV of claim 14, wherein:

the upper arm and the lower arm direct the supported wheel in a retracting direction during compression of the suspension;

the retracting direction is skewed by an angle of retracting wheel motion relative to a reference plane that is perpendicular to the wheel contact plane; and the-angle of retracting wheel motion is greater than about 0.5 degrees.

25. The ATV of claim 24, wherein the angle of retracting wheel motion is greater than about 3.5 degrees.

26. The ATV of claim 25, wherein the angle of retracting wheel motion is greater than about 7.0 degrees.

27. The ATV of claim 14, wherein the second distance is less than about 36 times the wheel radius.

28. The ATV of claim 27, wherein the second distance is less than about 24 times the wheel radius.

29. The ATV of claim 28, wherein the second distance is less than about 12 times the wheel radius.

30. The ATV of claim 14, wherein the second distance is less than about 9 times a wheel base distance of the ATV.

31. The ATV of claim 30, wherein the second distance is less than about 6 times a wheel base distance of the ATV.

32. The ATV of claim 31, wherein the second distance is less than about 3 times a wheel base distance of the ATV.

33. The ATV of claim 32, wherein the side view instant center axis intersects the wheel contact plane at a point disposed at a predetermined distance behind the momentary contact point of the supported wheel;

the predetermined distance being about 2.5 times the wheel base distance of the ATV.

34. The ATV of claim 14, wherein the suspension comprises a first arm rotatably coupled to a first leg of the frame such that the first arm rotates about a first rotational axis;

a second arm rotatably coupled to a second leg of the frame such that the second arm rotates about a second rotational axis;

the first leg having a first longitudinal axis; and the second leg having a second longitudinal axis.

35. The ATV of claim 34, wherein the first longitudinal axis and the second longitudinal axis intersect one another.

36. The ATV of claim 34, wherein the first longitudinal axis is generally parallel to the first rotational axis.

37. The ATV of claim 34, wherein the second longitudinal axis is generally parallel to the second rotational axis.

38. The ATV of claim 34, wherein the first leg is coupled to the second leg at a crotch.

39. The ATV of claim 38, wherein a riser extends between the first leg and the second leg, so that the riser, the first leg, and the second leg form a closed loop having a generally first triangular shape.

40. The ATV of claim 39, wherein the closed loop is coupled to a second closed loop by a plurality of crosspieces.

41. An all terrain vehicle (ATV) having at least one front wheel and at least one rear wheel, each wheel having a momentary contact point, the momentary contact points of the wheels defining a wheel contact plane of the ATV, the ATV comprising:

a frame;

a wheel carrier for rotatably supporting a supported wheel having a wheel radius;

a suspension comprising an upper arm coupled to the wheel carrier at an upper coupling and a lower arm coupled to the wheel carrier at a lower coupling;

the upper arm being rotatably coupled to the frame at an upper joint such that the upper arm rotates about an upper rotational axis;

the lower arm being rotatable coupled to the frame at a lower joint such that the lower arm rotates about a lower rotational axis;

the upper rotational axis and the lower rotational axis crossing one another to define a side view instant center axis of the suspension;

the side view instant center axis intersecting a strategic region;

the strategic region extending between the wheel contact plane and a second plane which intersects the wheel contact plane at a point proximate a momentary contact point of the supported wheel, wherein the second plane has a slope of H/L relative to the wheel contact plane;

where H is a height of a center of mass of the ATV; and where L is a wheel base distance of the ATV.

42. The ATV of claim 41, wherein the second plane has a slope of H/L relative to the wheel contact plane;

where H is a height of a center of mass of the ATV and an ATV rider; and where L is a wheel base distance of the ATV.

43. The ATV of claim 41, wherein the strategic region is further defined by a third plane, the third plane intersecting the wheel contact plane at a point located a predetermined distance rearward of the momentary contact point of the supported wheel.

44. The ATV of claim 43, wherein the third plane is generally perpendicular to the wheel contact plane.

* * * * *